(12) United States Patent
Kim

(10) Patent No.: US 11,318,957 B2
(45) Date of Patent: May 3, 2022

(54) METHOD, APPARATUS, ELECTRONIC DEVICE, COMPUTER PROGRAM AND COMPUTER READABLE RECORDING MEDIUM FOR MEASURING INTER-VEHICLE DISTANCE USING DRIVING IMAGE

(71) Applicant: THINKWARE CORPORATION, Gyeonggi-do (KR)

(72) Inventor: Shin Hyoung Kim, Gyeonggi-do (KR)

(73) Assignee: THINKWARE CORPORATION, Seongnam-si (KR)

(*) Notice: Subject to any disclaimer, the term of this patent is extended or adjusted under 35 U.S.C. 154(b) by 62 days.

(21) Appl. No.: 16/703,489

(22) Filed: Dec. 4, 2019

(65) Prior Publication Data

US 2020/0180656 A1 Jun. 11, 2020

(30) Foreign Application Priority Data

Dec. 6, 2018 (KR) .................. 10-2018-0156143

(51) Int. Cl.
*B60W 50/14* (2020.01)
*B60W 30/095* (2012.01)
*G06K 9/00* (2006.01)

(52) U.S. Cl.
CPC ........ *B60W 50/14* (2013.01); *B60W 30/0956* (2013.01); *G06K 9/00825* (2013.01);
(Continued)

(58) Field of Classification Search
CPC ...... B60R 1/00; B60T 8/171; B60W 30/0956; B60W 30/12; B60W 30/18163;
(Continued)

(56) References Cited

U.S. PATENT DOCUMENTS

| | | | | |
|---|---|---|---|---|
| 5,590,217 A | * | 12/1996 | Toyama | G06K 9/46 348/149 |
| 6,317,691 B1 | * | 11/2001 | Narayan | G08G 1/165 701/28 |
| 8,378,851 B2 | * | 2/2013 | Stein | G06K 9/00825 340/937 |

(Continued)

FOREIGN PATENT DOCUMENTS

DE 102013022050 A1 6/2015

OTHER PUBLICATIONS

EP Application No. 19214016.8, European Extended Search Report, dated Apr. 21, 2020, 10 pages.

*Primary Examiner* — Stephen R Burgdorf
(74) *Attorney, Agent, or Firm* — Westerman, Hattori, Daniels & Adrian, LLP

(57) ABSTRACT

A method for measuring an inter-vehicle distance using a processor is provided. The method includes acquiring a driving image photographed by a photographing device of a first vehicle; detecting a second vehicle from the driving image and calculating a ratio between an image width of the detected second vehicle and an image width of a lane in which the second vehicle is located; determining a size class of the second vehicle among a plurality of size classes based on the calculated ratio; determining a width of the second vehicle based on the determined size class of the second vehicle; and calculating a distance from the photographing device to the second vehicle based on the determined width of the second vehicle, a focal length of the photographing device, and the image width of the second vehicle.

14 Claims, 18 Drawing Sheets

(52) U.S. Cl.
CPC ... *B60W 2050/146* (2013.01); *B60W 2420/42* (2013.01); *B60W 2554/801* (2020.02)

(58) Field of Classification Search
CPC ............... B60W 40/02; B60W 50/14; B60W 2050/146; B60W 2420/42; B60W 2554/80; B60W 2554/801; G01C 21/3602; G01S 7/02; G01S 11/12; G06K 9/00791; G06K 9/00798; G06K 9/00805; G06K 9/00825; G06K 2209/23; G06T 7/536; G06T 7/60; G06T 7/70; G06T 2207/30252; G08G 1/052; G08G 1/054; G08G 1/167; H04N 5/23203
USPC ........................................................ 340/436
See application file for complete search history.

(56) References Cited

U.S. PATENT DOCUMENTS

| | | |
|---|---|---|
| 2008/0136612 A1 | 6/2008 | Kimiyoshi |
| 2009/0240432 A1* | 9/2009 | Osanai ............... G06T 7/74 701/300 |
| 2012/0154591 A1* | 6/2012 | Baur ................. B60R 1/00 348/148 |
| 2014/0037142 A1* | 2/2014 | Bhanu ............. G06K 9/00785 382/103 |
| 2014/0241579 A1* | 8/2014 | Nonaka ............ G06K 9/3241 382/103 |
| 2015/0269447 A1* | 9/2015 | Kumano ........... G06K 9/00798 382/104 |
| 2017/0240149 A1 | 8/2017 | Hyun |
| 2017/0259667 A1* | 9/2017 | Cho ................. G01C 21/265 |
| 2018/0196133 A1* | 7/2018 | Sun ................. G01S 13/867 |

* cited by examiner

52

53

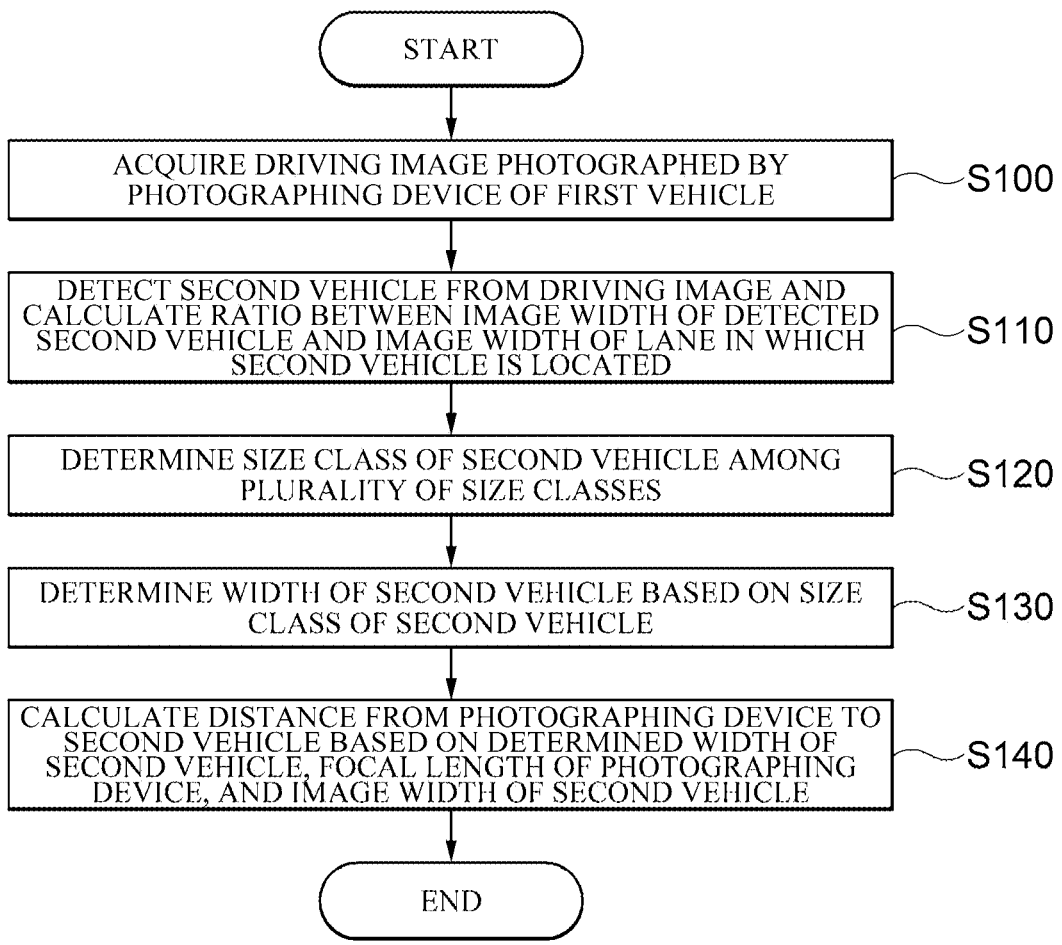

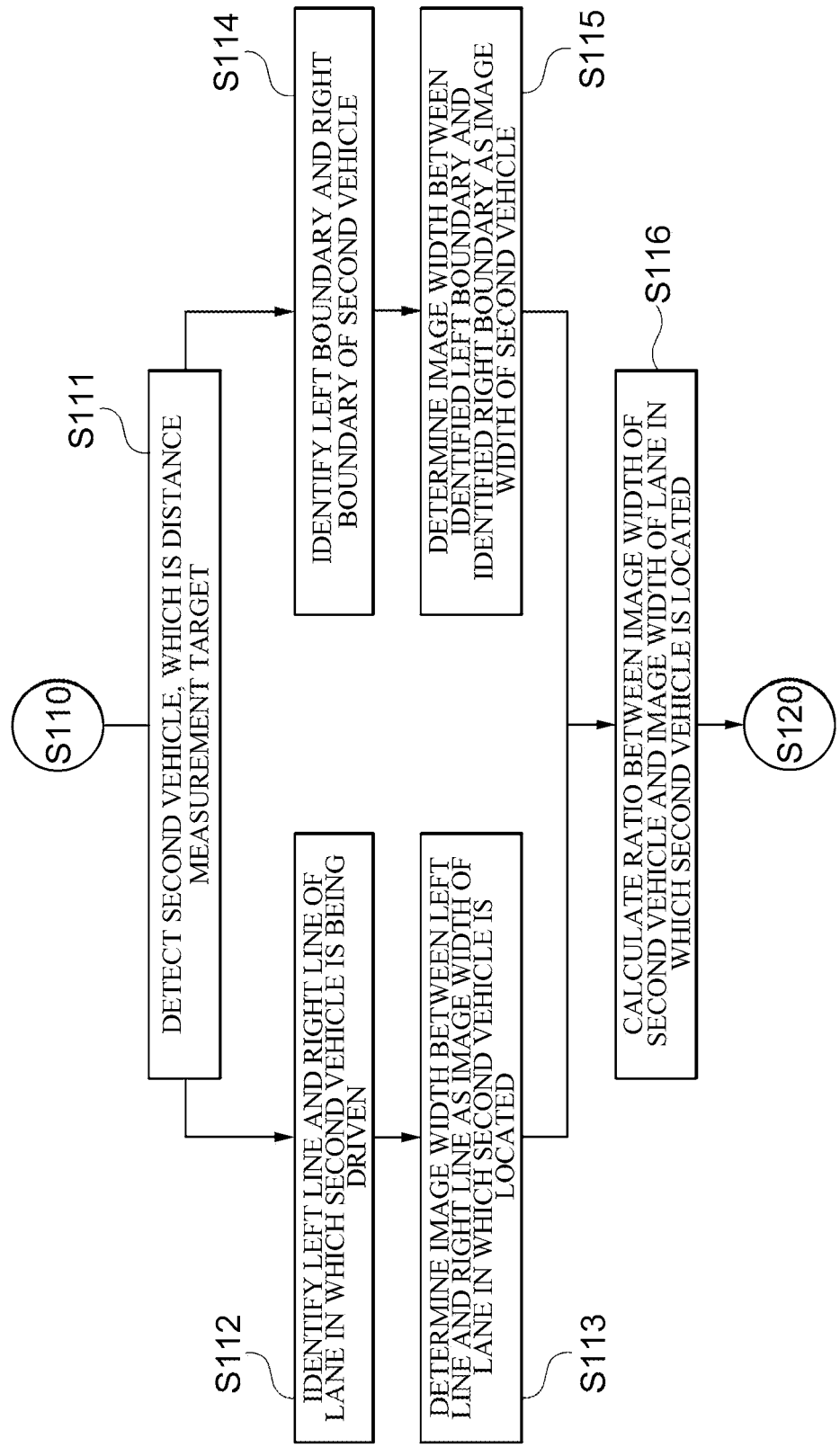

1001

METHOD, APPARATUS, ELECTRONIC DEVICE, COMPUTER PROGRAM AND COMPUTER READABLE RECORDING MEDIUM FOR MEASURING INTER-VEHICLE DISTANCE USING DRIVING IMAGE

CROSS-REFERENCE TO RELATED APPLICATION(S)

This application claims benefit of priority to Korean Patent Application No. 10-2018-0156143 filed on Dec. 6, 2018 in the Korean Intellectual Property Office, the disclosure of which is incorporated herein by reference in its entirety.

BACKGROUND

1. Field

The present invention relates to a method, an apparatus, an electronic device, a computer program, and a computer readable recording medium for measuring an inter-vehicle distance using a driving image photographed while driving of a vehicle.

2. Description of Related Art

It is most important to safely drive a vehicle and prevent a traffic accident at the time of driving the vehicle. To this end, various assistance apparatuses performing an attitude control of the vehicle, a function control of components of the vehicle, and the like, and safety apparatuses such as a seat belt, an air bag, and the like, have been mounted in the vehicle.

In addition, apparatuses such as a car dash cam and the like positioned in the vehicle and storing a driving image of the vehicle and data transmitted from various sensors to thereby find out a cause of an accident of the vehicle at the time of occurrence of the accident have recently been provided in the vehicle. Portable terminals such as a smartphone and a tablet in which a car dash cam application, a navigation application, or the like may be mounted are used as the apparatuses for a vehicle as described above.

In recent years, advanced driver assistance systems (ADAS) have been developed and distributed to assist the driving of the driver of the vehicle by using the driving image photographed while driving of the vehicle, thereby increasing convenience as well as safe driving of the driver.

Among functions provided by such an ADAS, a forward collision warning system (FCWS) is a function of measuring a distance from a front vehicle located in front of a vehicle's driving route and informing the driver that there is a risk of collision depending on the distance.

However, according to a conventional method for measuring an inter-vehicle distance, since the inter-vehicle distance is measured by treating a vehicle width as a predetermined specific constant value without considering an actual vehicle width of a large number of vehicles having different widths (e.g., compact cars, midsize cars, and full-sized cars), there was a problem that the measured inter-vehicle distance value is not accurate.

In addition, in the ADAS, a small error of the measured value on which the risk judgment is based may be a big problem in a system operation, thereby deteriorating convenience and stability of the driver. As an example, although the distance between the vehicles is not large enough to perform a forward collision warning, the warning is performed, thereby causing the ADAS function to interfere with a safe driving of the driver.

SUMMARY

An object of the present invention is to calculate a ratio between an image width of a front vehicle and an image width of a lane in which the front vehicle is located, and determine a size class of the front vehicle among a plurality of size classes (e.g., a compact car, a midsize car, and a full-sized car) based on the calculated ratio.

Another object of the present invention is to determine a width of a front vehicle based on a size class of the front vehicle, and measure an inter-vehicle distance between a reference vehicle and the front vehicle using the determined width of the front vehicle.

Still another object of the present invention is to provide an accurate forward collision warning system using the measured inter-vehicle distance.

According to an exemplary embodiment of the present invention, a method for measuring an inter-vehicle distance using a processor includes acquiring a driving image photographed by a photographing device of a first vehicle which is being driven; detecting a second vehicle from the driving image and calculating a ratio between an image width of the detected second vehicle and an image width of a lane in which the second vehicle is located; determining a size class of the second vehicle based on the calculated ratio; determining a width of the second vehicle based on the determined size class of the second vehicle; and calculating a distance from the photographing device to the second vehicle based on the determined width of the second vehicle, a focal length of the photographing device, and the image width of the second vehicle.

The calculating of the ratio may include detecting the second vehicle, which is a distance measurement target, among a plurality of vehicles included in the driving image; identifying a left line and a right line of a lane in which the second vehicle is being driven, from the driving image; and determining an image width between the identified left line and the identified right line as the image width of the lane in which the second vehicle is located.

The calculating of the ratio may include identifying a left boundary and a right boundary of the second vehicle from an image of the detected second vehicle; and determining an image width between the identified left boundary and the identified right boundary as the image width of the second vehicle.

In the determining of the size class of the second vehicle, the size class of the second vehicle may be determined among a plurality of size classes based on the calculated ratio, and the plurality of size classes may include at least two of a first size class corresponding to a compact car, a second size class corresponding to a midsize car, and a third size class corresponding to a full-sized car.

The determining of the size class of the second vehicle may include determining the size class of the second vehicle as the first size class when the calculated ratio is smaller than a first value; determining the size class of the second vehicle as the second size class when the calculated ratio is greater than the first value and smaller than a second value; and determining the size class of the second vehicle as the third size class when the calculated ratio is greater than the second value.

The method may further include storing a width of the vehicle for each of the plurality of size classes, wherein the determining of the width of the second vehicle includes detecting a width of the vehicle corresponding to the determined size class of the vehicle among the stored widths of the vehicle; and determining the detected width of the vehicle as the width of the second vehicle.

The method may further include generating guide data for guiding a collision risk level corresponding to a distance difference between the first vehicle and the second vehicle, when the calculated distance is smaller than a predetermined distance.

In the detecting of the second vehicle when the first vehicle is being driven on the lane, the second vehicle located on the same lane as the first vehicle may be detected among a plurality of vehicles included in the driving image.

In the detecting of the second vehicle when the first vehicle is departing from the lane, the second vehicle located on a lane to which a front surface of the first vehicle is directed may be detected among a plurality of vehicles included in the driving image.

In the calculating of the distance, the distance from the photographing device to the second vehicle may be calculated based on $$!D=W\times(f\div w), \text{ and}$$

D is the distance from the photographing device to the second vehicle, W is the width of the second vehicle, f is the focal length of the photographing device, and w is the image width of the second vehicle.

According to another exemplary embodiment of the present invention, an apparatus for measuring an inter-vehicle distance includes an image acquiring unit configured to acquire a driving image photographed by a photographing device of a first vehicle which is being driven; a detecting unit configured to detect a second vehicle from the driving image; a ratio calculating unit configured to calculate a ratio between an image width of the detected second vehicle and an image width of a lane in which the second vehicle is located; a vehicle size class calculating unit configured to determine a size class of the second vehicle based on the calculated ratio; a vehicle width calculating unit configured to determine a width of the second vehicle based on the determined size class of the second vehicle; and a distance calculating unit configured to calculate a distance from the photographing device to the second vehicle based on the determined width of the second vehicle, a focal length of the photographing device, and the image width of the second vehicle.

The detecting unit may detect the second vehicle, which is a distance measurement target, among a plurality of vehicles included in the driving image, and the ratio calculating unit may identify a left line and a right line of a lane in which the second vehicle is being driven, from the driving image, and determine an image width between the identified left line and the identified right line as the image width of the lane in which the second vehicle is located.

The ratio calculating unit may identify a left boundary and a right boundary of the second vehicle from an image of the detected second vehicle, and determine an image width between the identified left boundary and the identified right boundary as the image width of the second vehicle.

The vehicle size class calculating unit may determine the size class of the second vehicle among a plurality of size classes based on the calculated ratio, and the plurality of size classes may include at least two of a first size class corresponding to a compact car, a second size class corresponding to a midsize car, and a third size class corresponding to a full-sized car.

The vehicle size class calculating unit may determine the size class of the second vehicle as the first size class when the calculated ratio is smaller than a first value, determine the size class of the second vehicle as the second size class when the calculated ratio is greater than the first value and smaller than a second value, and determine the size class of the second vehicle as the third size class when the calculated ratio is greater than the second value.

The apparatus for measuring an inter-vehicle distance may further include a storing unit configured to store a width of the vehicle for each of the plurality of size classes, wherein the vehicle size class calculating unit detects a width of the vehicle corresponding to the determined size class of the vehicle among the stored widths of the vehicle.

The apparatus for measuring an inter-vehicle distance may further include a guide data generating unit configured to generate guide data for guiding a collision risk level corresponding to a distance difference between the first vehicle and the second vehicle, when the calculated distance is smaller than a predetermined distance.

The detecting unit may detect the second vehicle located on the same lane as the first vehicle among a plurality of vehicles included in the driving image.

The detecting unit may detect the second vehicle located on a lane to which a front surface of the first vehicle is directed among a plurality of vehicles included in the driving image.

The distance calculating unit may calculate the distance from the photographing device to the second vehicle based on $$!D=W\times(f\div w), \text{ and}$$

D is the distance from the photographing device to the second vehicle, W is the width of the second vehicle, f is the focal length of the photographing device, and w is the image width of the second vehicle.

According to another exemplary embodiment of the present invention, an electronic device that provides guidance for assisting a driver based on an inter-vehicle distance includes an output unit configured to output guide information which is checked by the driver; an image acquiring unit configured to acquire a driving image photographed by a photographing device; a ratio calculating unit configured to detect a front vehicle from the driving image and calculate a ratio between an image width of the detected front vehicle and an image width of a lane in which the front vehicle is located; a vehicle size class calculating unit configured to determine a size class of the front vehicle based on the calculated ratio; a vehicle width calculating unit configured to determine a vehicle width of the front vehicle based on the determined size class of the front vehicle; a distance calculating unit configured to calculate a distance from the photographing device to the front vehicle based on the determined vehicle width of the front vehicle, a focal length of the photographing device, and the image width of the front vehicle; and a control unit configured to control the output unit to output a front vehicle collision warning according to the calculated distance.

The output unit may further include a display unit configured to combine the photographed driving image with a guidance object to output an augmented reality image, and the control unit may generate a guidance object for the front vehicle collision warning and control the display unit to display the generated guidance object for the front vehicle collision warning superimposed on a front vehicle display region of the augmented reality image.

According to another exemplary embodiment of the present invention, a computer readable recording medium on which a program for executing the method for measuring an inter-vehicle distance described above is recorded may be provided.

According to another exemplary embodiment of the present invention, a program in which a code for executing the method for measuring an inter-vehicle distance described above is recorded may be provided.

According to various exemplary embodiments of the present invention described above, the performance of the ADAS may be improved by calculating the size class of the front vehicle and using the calculated size class as the input value at the time of ADAS guidance.

Further, according to various exemplary embodiments of the present invention described above, by reducing the error in the inter-vehicle distance between the reference vehicle and the front vehicle, a more accurate forward collision warning may be performed.

BRIEF DESCRIPTION OF DRAWINGS

The above and other aspects, features and other advantages of the present disclosure will be more clearly understood from the following detailed description taken in conjunction with the accompanying drawings, in which:

FIG. 10 is a flowchart illustrating a method for measuring an inter-vehicle distance according to an exemplary embodiment of the present invention.

FIG. 11 is a flowchart illustrating a method for calculating a ratio between an image width of a second vehicle and an image width of a lane in which the second vehicle is located according to an exemplary embodiment of the present invention.

DETAILED DESCRIPTION

Figure 1:
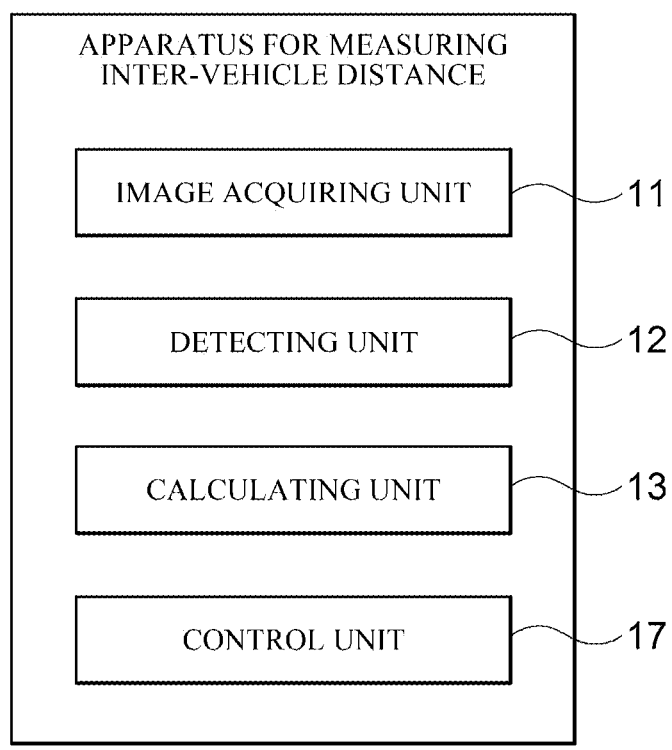
FIG. 1 is a block diagram illustrating an apparatus for measuring an inter-vehicle distance according to an exemplary embodiment of the present invention.

The following description merely illustrates the principles of the present invention. Therefore, those skilled in the art may implement the principle of the present invention and invent various devices included in the spirit and scope of the present invention, although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, a block diagram of the present specification shows a conceptual aspect of an illustrative circuit for embodying the principle of the present invention. Similarly, it is to be understood that all flowcharts, state transition diagrams, pseudo-codes, and the like, illustrate various processes that may be tangibly embodied in a computer readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute appropriate software as well as dedicated hardware. When the functions are provided by the processors, they may be provided by a single dedicated processor, a single shared processor, or a plurality of individual processors and some thereof may be shared with each other.

In addition, terms mentioned as a processor, a control, or a concept similar to the processor or the control should not be interpreted to exclusively cite hardware having the capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit elements performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become more obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make the gist of the present invention unclear, it will be omitted.

Hereinafter, various exemplary embodiments of the present invention will be described in detail with reference to the accompanying drawings.

Figure 2:
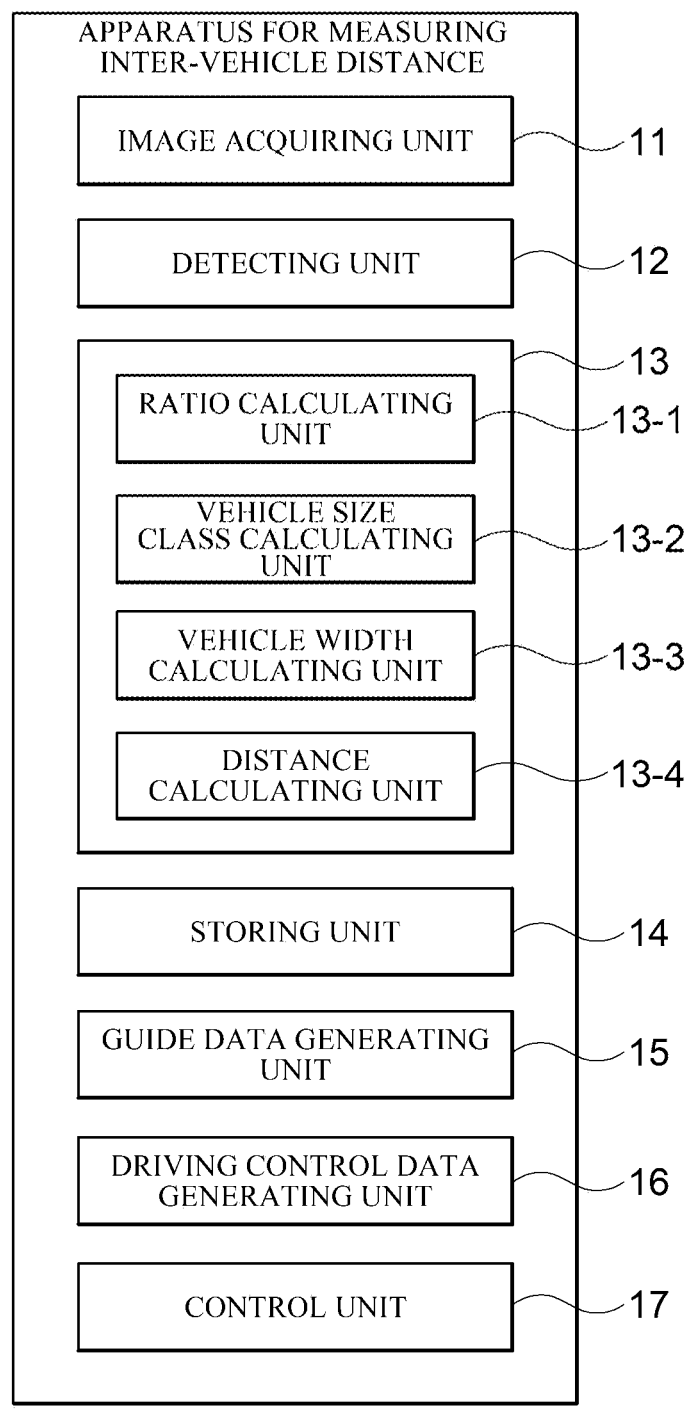
FIG. 2 is a block diagram illustrating in more detail the apparatus for measuring an inter-vehicle distance according to an exemplary embodiment of the present invention.

FIG. 1 is a block diagram illustrating an apparatus for measuring an inter-vehicle distance according to an exemplary embodiment of the present invention. FIG. 2 is a block diagram illustrating in more detail the apparatus for measuring an inter-vehicle distance according to an exemplary embodiment of the present invention.

Referring to FIGS. 1 to 2, an apparatus 10 for measuring an inter-vehicle distance may include all or some of an image acquiring unit 11, a detecting unit 12, a calculating unit 13, a storing unit 14, a guide data generating unit 15, a driving control data generating unit 16, and a control unit 17. Here, the calculating unit 13 may include all or some of a ratio calculating unit 13-1, a vehicle size class calculating unit 13-2, a vehicle width calculating unit 13-3, and a distance calculating unit 13-4.

Here, the apparatus 10 for measuring an inter-vehicle distance may measure a distance between a first vehicle, which is the basis of the distance measurement, and a second vehicle, which is the target of the distance measurement. Here, the first vehicle, which is a vehicle which is the basis of the distance measurement, may alternatively be referred to as a reference vehicle, and the second vehicle, which is a vehicle which is the target of the distance measurement, may alternatively be referred to as a target vehicle. In addition, the second vehicle, which is positioned near the first vehicle, may include a front vehicle positioned in front of the first vehicle and a rear vehicle positioned behind the first vehicle.

Such an apparatus 10 for measuring an inter-vehicle distance may measure the distance between the first vehicle and the second vehicle using a driving image acquired while driving of the first vehicle. Specifically, the apparatus 10 for measuring an inter-vehicle distance may detect the second vehicle from the driving image of the first vehicle and calculate a ratio between an image width of the detected target vehicle and an image width of the lane in which the front vehicle is located. In addition, the apparatus 10 for measuring an inter-vehicle distance may determine a size class of the front vehicle among a plurality of size classes based on the calculated ratio. In addition, the apparatus 10 for measuring an inter-vehicle distance may determine a width of the front vehicle based on the determined size class of the front vehicle. In addition, the apparatus 10 for measuring an inter-vehicle distance may calculate a distance from a photographing device to the second vehicle based on the determined width of the second vehicle, a focal length of the photographing device, and the image width of the second vehicle.

Here, the apparatus 10 for measuring an inter-vehicle distance may be implemented using software, hardware, or a combination thereof. As an example, according to hardware implementation, the apparatus 10 for measuring an inter-vehicle distance may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

Hereinafter, for convenience of explanation, in a case in which the second vehicle to be measured in the distance is the front vehicle, each component module constituting the apparatus 10 for measuring an inter-vehicle distance will be described in more detail.

The image acquiring unit 11 may acquire a driving image photographed by a photographing device of the first vehicle. Specifically, the image acquiring unit 11 may acquire the driving image photographed by the photographing device installed in the first vehicle while driving of the first vehicle in real time. Here, the acquired driving image may include a plurality of lanes distinguished along a line, a road including a plurality of lanes, and a plurality of vehicles driving on the road.

Here, the line may mean each of two lines forming the lane in which the vehicle is located. In addition, the lane may be formed by the line such as a first lane, a second lane, . . . an N lane, and may mean a road on which the vehicle is driven.

The detecting unit 12 may detect the second vehicle from the driving image acquired by the image acquiring unit 11. Specifically, the detecting unit 12 may select the second vehicle, which is a distance measurement target, among the plurality of vehicles included in the driving image acquired by the image acquiring unit 11, and detect the selected second vehicle. Here, the detecting unit 12 may select the second vehicle, which is the distance measurement target, among the plurality of vehicles included in the driving image based on driving state information indicating whether the first vehicle is being accurately driven on a specific lane or is departing from the specific lane.

As an example, when the first vehicle is being driven on the specific lane, the detecting unit 12 may select the second vehicle located on the same lane as the first vehicle among the plurality of vehicles included in the driving image, and detect the selected second vehicle.

As another example, when the first vehicle is departing from the specific lane, the detecting unit 12 may select the second vehicle located on a lane to which a front surface of the first vehicle which is departing from the specific lane is directed, among the plurality of vehicles included in the driving image, and detect the selected second vehicle.

The ratio calculating unit 13-1 may calculate a ratio between an image width of the second vehicle detected by the detecting unit 12 and an image width of the lane in which the second vehicle is located. Here, the image width may mean a width occupied by an image of a corresponding object in an image plane. That is, the image width of the second vehicle may be a width occupied by the image of the second vehicle in the driving image acquired by the image acquiring unit 11, and the image width of the lane in which the second vehicle is located may be a width occupied by an image of the lane in which the second vehicle is located in the driving image acquired by the image acquiring unit 11.

The ratio calculating unit 13-1 may set a reference line for calculating the image width of the second vehicle in the driving image by acquired by the image acquiring unit 11, and calculate the image width of the second vehicle based on the set reference line. In addition, the ratio calculating unit 13-1 may set a reference line for calculating the image width of the lane in which the second vehicle is located in the driving image by acquired by the image acquiring unit 11, and calculate the image width of the lane in which the second vehicle is located based on the set reference line.

When the image width of the lane in which the second vehicle is located is calculated, the ratio calculating unit 13-1 may identify a left line and a right line of the lane in which the second vehicle is being driven from the driving image acquired by the image acquiring unit 11. As an example, the ratio calculating unit 13-1 may identify each line located on both sides of the second vehicle by converting the driving image into a gray image and performing a line detection algorithm. In addition, the ratio calculating unit 13-1 may determine an image width between the identified left line and the identified right line as the image width of the lane in which the second vehicle is located. As an example, the ratio calculating unit 13-1 may determine a first point at which a line indicating the location of the second vehicle in the lane and the identified left line meet, and a second point at which the line indicating the location of the second vehicle in the lane and the identified right line meet, and may determine an image width between the first point and the second point as the image width of the lane in which the second vehicle is located.

In addition, when the image width of the second vehicle is calculated, the ratio calculating unit 13-1 may identify a left boundary and a right boundary of the second vehicle from the detected image of the second vehicle. In addition, the ratio calculating unit 13-1 may determine an image width between the identified left boundary and the identified right boundary as the image width of the second vehicle. As an example, the ratio calculating unit 13-1 may determine an image width between a left boundary line corresponding to the identified left boundary and a right boundary line corresponding to the identified right boundary as the image width of the second vehicle.

Meanwhile, if the image width of the lane in which the second vehicle is located and the image width of the second vehicle are calculated, the ratio calculating unit 13-1 may calculate a ratio between the image width of the second vehicle and the image width of the lane in which the second vehicle is located. As an example, the ratio calculating unit 13-1 may calculate the ratio between the image width of the second vehicle and the image width of the lane in which the second vehicle is located, based on the following Equation 1.

$$\text{Ratio} = (\text{Vehicle}W / \text{Lane}W) \times 100 \qquad \text{[Equation 1]}$$

Here, VehicleW may mean the image width of the second vehicle, LaneW may mean the image width of the lane in which the second vehicle is located, and Ratio may mean the ratio between the image width of the second vehicle and the image width of the lane in which the second vehicle is located.

The vehicle size class calculating unit 13-2 may determine a size class of the second vehicle of a plurality of size classes based on the ratio calculated by the ratio calculating unit 13-1. Here, the plurality of size classes may include at least two of a first size class corresponding to a compact car, a second size class corresponding to the midsize car, or a third size class corresponding to a full-sized car.

In this case, if the calculated ratio is smaller than a first value, the vehicle size class calculating unit 13-2 may determine the size class of the second vehicle as the first size class. In addition, if the calculated ratio is greater than the first value and smaller than a second value, the vehicle size class calculating unit 13-2 may determine the size class of the second vehicle as the second size class. In addition, if the calculated ratio is greater than the second value, the vehicle size class calculating unit 13-2 may determine the size class of the second vehicle as the third size class. As an example, the first value may be 48% and the second value may be 60%.

However, the size class of the second vehicle is merely an example of the present invention and may also be further subdivided according to implementation. As an example, the plurality of size classes may also be configured to include size classes corresponding to a micro compact car, a compact car, a compact and midsize car, a midsize car, a midsize and full-sized car, a full-sized car, and an ultra full-sized car, respectively.

Meanwhile, the vehicle width calculating unit 13-3 may determine the width of the second vehicle based on the size class of the second vehicle. Specifically, the storing unit 14 may store the width of the vehicle with respect to each of the plurality of size classes. As an example, the storing unit 14 may match the vehicle width to each of the plurality of size classes and store the matched vehicle width, as illustrated in the following Table 1.

TABLE 1

|  | First Size Class | Second Size Class | Third Size Class |
| --- | --- | --- | --- |
| Vehicle Width | 1,500 mm | 1,900 mm | 2,500 mm |

Information illustrated in Table 1 above may also be pre-stored in the storing unit 14, may also be provided from a communication network connected through the communicating unit 180, and may also be updated.

In this case, the vehicle width calculating unit 13-3 may determine the width of the second vehicle by detecting a vehicle width corresponding to the determined size class among the vehicle widths pre-stored in the storing unit 14.

Meanwhile, the distance calculating unit 13-4 may calculate a distance from a photographing device to the second vehicle based on the determined width of the second vehicle, a focal length of the photographing device, and the image width of the second vehicle. Specifically, the distance calculating unit 13-4 may calculate a distance from a photographing device installed in the first vehicle to the second vehicle, based on the following Equation 2.

$$!D = W \times (f \div w) \quad \text{[Equation 2]}$$

Here, D may be the distance from the photographing device installed in the first vehicle to the second vehicle, W may be the width of the second vehicle, f may be the focal length of the photographing device, and w may be the image width of the second vehicle. Here, the image width w of the second vehicle may be the same value as VehicleW of Equation 1 above.

Meanwhile, if the distance between the photographing device 20 and the second vehicle 30 is calculated, the distance calculating unit 13-4 may calculate a distance value between the first vehicle in which the photographing device 20 is installed and the second vehicle 30 by appropriately correcting the calculated distance value between the photographing device 20 and the second vehicle 30.

Meanwhile, the control unit 17 controls an overall operation of the apparatus 10 for measuring an inter-vehicle distance. Specifically, the control unit 17 may control all or some of the image acquiring unit 11, the detecting unit 12, the calculating unit 13, the storing unit 14, the guide data generating unit 15, and the driving control data generating unit 16.

In particular, the control unit 17 may control the detecting unit 12 to detect the second vehicle from the driving image of the first vehicle acquired by the image acquiring unit 11. In addition, the control unit 17 may control the calculating unit 13 to calculate a ratio between the detected image width of the target vehicle and the image width of the lane in which the front vehicle is located, determine a size class of the front vehicle among the plurality of size classes based on the calculated ratio, and determine a width of the front vehicle based on the determined size class of the front vehicle. In addition, the control unit 17 may control the calculating unit 13 to calculate the distance from the photographing device to the second vehicle based on the determined width of the second vehicle, the focal length of the photographing device, and the image width of the second vehicle.

In addition, if inter-vehicle distance information between the first vehicle and the second vehicle is acquired, the control unit 17 may control the guide data generating unit 15 to generate guide data for assisting safe driving of a driver of the first vehicle based on the acquired inter-vehicle distance information. Specifically, if the inter-vehicle distance calculated by the distance calculating unit 13-4 is smaller than a determined distance, the guide data generating unit 15 may generate guide data for guiding a distance difference between the first vehicle and the second vehicle. As an example, the guide data generated by the guide data generating unit 15 may be data for warning by voice or guiding by an image that the inter-vehicle distance needs attention.

As another example, if the inter-vehicle distance calculated by the distance calculating unit 13-4 is smaller than the predetermined distance, the guide data generating unit 15 may generate data for guiding a collision risk level corresponding to the distance difference between the first vehicle and the second vehicle. As an example, when the distance difference between the first vehicle and the second vehicle is divided into a plurality of levels, the guide data generating unit 15 may generate data for guiding a first risk level when the inter-vehicle distance is smaller than a first value, may generate data for guiding a second risk level having the degree of risk higher than the first risk level when the inter-vehicle distance is greater than the first value and smaller than a second value, and may generate data for guiding a third risk level having the degree of risk greater than the second risk level when the inter-vehicle distance is greater than the second value.

Meanwhile, if the inter-vehicle distance information between the first vehicle and the second vehicle is acquired, the control unit 17 may control the driving control data generating unit 16 to generate driving control data for controlling autonomous driving of the first vehicle based on the acquired inter-vehicle distance information. Specifically, when the first vehicle is operating in an autonomous driving mode and the inter-vehicle distance calculated by the distance calculating unit 13-4 is smaller than the predetermined distance, the control unit 17 may control the driving control data generating unit 16 to generate the driving control data for controlling the autonomous driving of the first vehicle (e.g., command data to control a speed of the first vehicle to decrease from a current speed to a predetermined speed or to stop the first vehicle). Here, the driving control data generated by the driving control data generating unit 16 may be transmitted to an autonomous driving control unit which collectively controls the autonomous driving of the first vehicle, and the autonomous driving control unit of the first vehicle may control the first vehicle to be autonomously driven by controlling various units (brake, steering wheel, electric motor, engine, etc.) included in the first vehicle based on such a transmitted information.

Hereinafter, a method for measuring an inter-vehicle distance according to an exemplary embodiment of the present invention will be described in more detail with reference to FIGS. 3 to 8.

Figure 3:
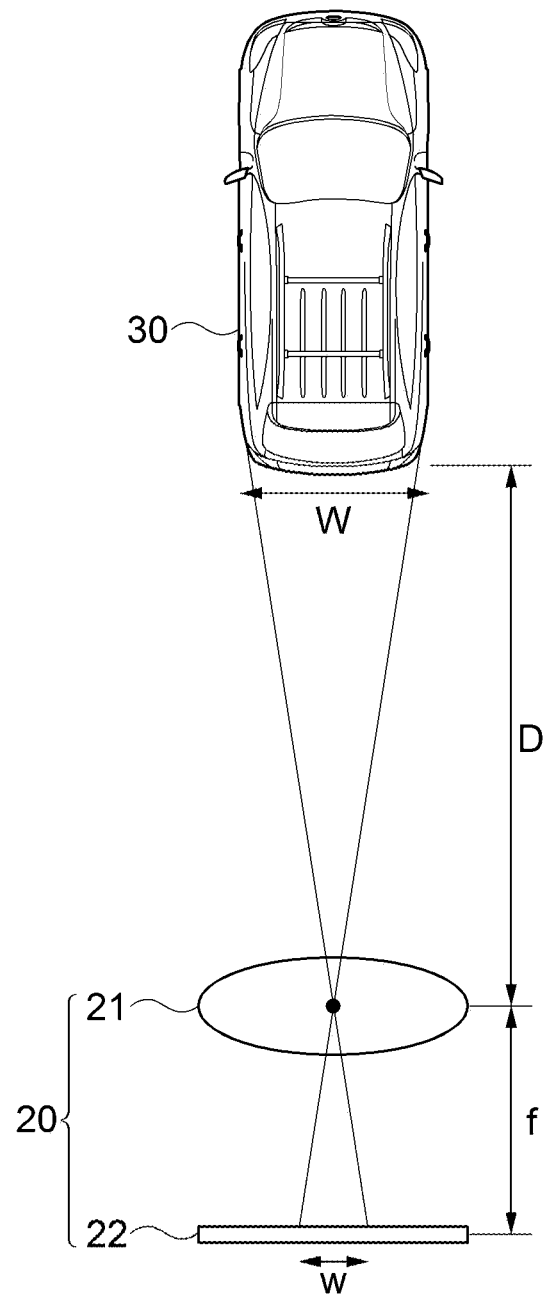
FIG. 3 is a conceptual diagram illustrating a method for measuring an inter-vehicle distance according to an exemplary embodiment of the present invention.

FIG. 3 is a conceptual diagram illustrating a method for measuring an inter-vehicle distance according to an exemplary embodiment of the present invention. Referring to FIG. 3, a photographing device 20 for photographing a driving image of a first vehicle may be installed in the first vehicle (not illustrated). Here, the photographing device 20 may be implemented as a car dash cam or a car video recorder installed in the first vehicle to photograph the surroundings of the vehicle in a situation of driving or parking of the vehicle. Alternatively, the photographing device 20 may also be implemented as a camera formed in a navigation device for performing a route guidance to the driver of the first vehicle.

Such a photographing device 20 may include a lens unit 21 and an imaging element 22, and may further include all or some of a lens unit driver, an aperture, an aperture driver, an imaging element controller 116, and an image processor although not illustrated in FIG. 3. Here, the lens unit 21 may perform a function of condensing an optical signal, and the optical signal transmitted through the lens unit 21 reaches an imaging area of the imaging device 22 to form an optical image. Here, as the imaging device 22, a charge coupled device (CCD), a complementary metal oxide semiconductor image sensor (CIS), a high speed image sensor, or the like that converts the optical signal into an electrical signal may be used.

Meanwhile, the apparatus 10 for measuring an inter-vehicle distance may calculate a distance between the photographing device 20 installed in the first vehicle and the second vehicle 30 using the driving image photographed by the photographing device 20 of the first vehicle based on Equation 2 described above. To this end, the apparatus 10 for measuring an inter-vehicle distance may first calculate a ratio between an image width of the second vehicle 30 and an image width of a lane in which the second vehicle 30 is located from the driving image acquired by the photographing device 20 of the first vehicle, determine a size class of the second vehicle 30 among a plurality of size classes based on the calculated ratio, and calculate a width W of the second vehicle 30 based on the determined size class of the second vehicle. An operation of the calculating unit 13 of the apparatus 10 for measuring an inter-vehicle distance will be described in more detail with reference to FIGS. 4 to 8.

Figure 4:
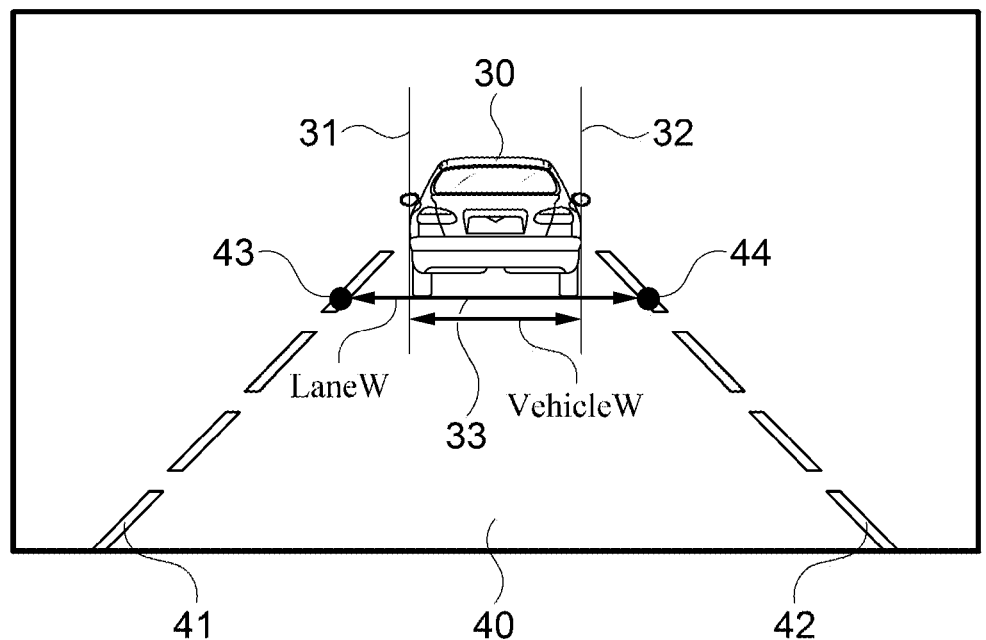
FIG. 4 is a diagram illustrating a ratio between an image width of a second vehicle and an image width of a lane in which the second vehicle is located according to an exemplary embodiment of the present invention.

FIG. 4 is a diagram illustrating a ratio between an image width of a second vehicle and an image width of a lane in which the second vehicle is located according to an exemplary embodiment of the present invention. Referring to FIG. 4, a driving image 50 photographed by the photographing device 20 of the first vehicle may include the second vehicle 30 driving in front of the first vehicle, a lane 40 on which the second vehicle is being driven, and a left line 41 and a right line 42 that separate the lane 40 from other lanes.

In this case, the ratio calculating unit 13-1 may calculate an image width VehicleW of the second vehicle 30. Specifically, the ratio calculating unit 13-1 may identify a left boundary 31 and a right boundary 32 of the second vehicle 30 from the image of the second vehicle 30. In addition, the ratio calculating unit 13-1 may determine an image width between the identified left boundary 31 and the identified right boundary 32 as the image width VehicleW of the second vehicle.

In addition, the ratio calculating unit 13-1 may identify the left line 41 and the right line 42 of the lane 40 in which the second vehicle 30 is being driven, from the acquired driving image 50. In addition, the ratio calculating unit 13-1 may set a line 33 indicating a location of the second vehicle 30 in the lane. Here, the line 33 indicating the location of the second vehicle 30 in the lane may be implemented as a line extending from the lowest end of the second vehicle 30 in the driving image 50. As an example, the line 33 indicating the location of the second vehicle 30 in the lane may be implemented as a line extending from a lower end of the left wheel and a lower end of the right wheel of the second vehicle 30. Meanwhile, a first point 43 at which the line 33 indicating the second vehicle 30 in the lane and the left line 41 meet, and a second point 44 at which the line 33 indicating the second vehicle 30 in the lane and the right line 42 meet may be determined, and an image width LaneW between the first point 43 and the second point 44 may be determined as an image width LaneW of the lane in which the second vehicle 30 is located.

Meanwhile, if the image width VehicleW of the second vehicle and the image width LaneW of the lane in which the second vehicle 30 is located are calculated, the ratio calculating unit 13-1 may calculate a ratio between the image width of the second vehicle and the image width of the lane in which the second vehicle is located by applying Equation 1 described above.

Figure 5:
FIG. 5 is a diagram illustrating an actual example of calculating a ratio between a vehicle image width and a lane image width when the front vehicle is a compact car.

FIG. 5 is a diagram illustrating an actual example of calculating a ratio between a vehicle image width and a lane image width when the front vehicle is a compact car. Referring to FIG. 5, the detecting unit 12 according to an exemplary embodiment of the present invention may detect a compact car located in front of the first vehicle from a driving image 51 photographed while driving of the first vehicle. In addition, the ratio calculating unit 13-1 may calculate a ratio (40) between an image width VehicleW (46) of the compact car and an image width LaneW (115) of the lane in which the compact car is being driven.

Figure 6:
FIG. 6 is a diagram illustrating an actual example of calculating a ratio between a vehicle image width and a lane image width when the front vehicle is a midsize car.

FIG. 6 is a diagram illustrating an actual example of calculating a ratio between a vehicle image width and a lane image width when the front vehicle is a midsize car. Referring to FIG. 6, the detecting unit 12 according to an exemplary embodiment of the present invention may detect a midsize car located in front of the first vehicle from a driving image 52 photographed while driving of the first vehicle. In addition, the ratio calculating unit 13-1 may calculate a ratio (46.1) between an image width VehicleW (88) of the midsize car and an image width LaneW (191) of the lane in which the midsize car is being driven.

Figure 7:
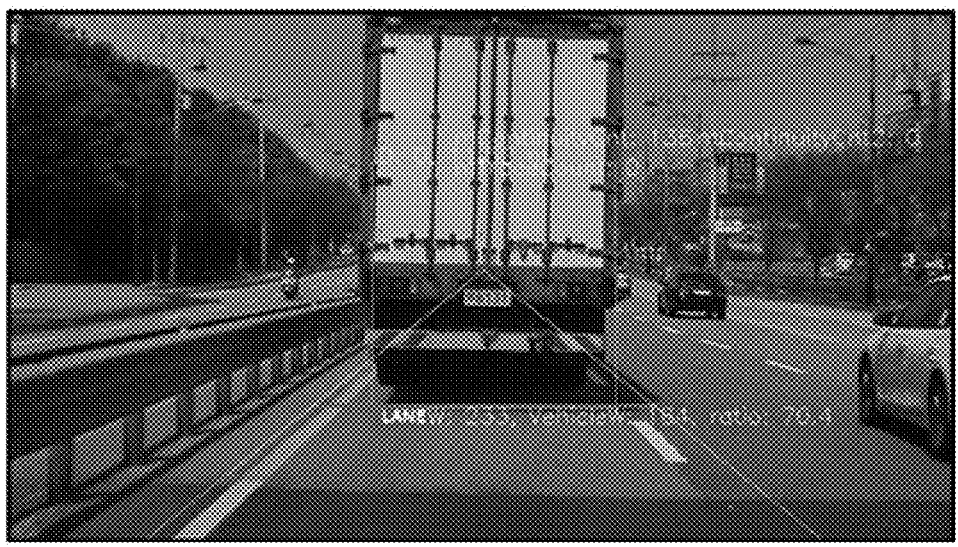
FIG. 7 is a diagram illustrating an actual example of calculating a ratio between a vehicle image width and a lane image width when the front vehicle is a full-sized car.

FIG. 7 is a diagram illustrating an actual example of calculating a ratio between a vehicle image width and a lane image width when the front vehicle is a full-sized car. Referring to FIG. 7, the detecting unit 12 according to an exemplary embodiment of the present invention may detect a full-sized car located in front of the first vehicle from a driving image 53 photographed while driving of the first vehicle. In addition, the ratio calculating unit 13-1 may calculate a ratio (70.4) between an image width VehicleW (184) of the full-sized car and an image width LaneW (223) of the lane in which the full-sized car is being driven.

As such, when the distance between the first vehicle and the second vehicle is closer, the image width of the second vehicle and the image width of the lane in which the second vehicle is located may become larger, and when the distance between the first vehicle and the second vehicle increases, the image width of the second vehicle and the image width of the lane in which the second vehicle is located may become smaller. However, since the ratio described above is proportional to the size of the second vehicle without affecting the distance between the first vehicle and the second vehicle, the ratio described above may be used as an index for calculating the size of the second vehicle according to the present invention.

Meanwhile, according to the above example, if the ratio between the image width of the second vehicle and the image width of the lane in which the second vehicle is located is calculated, the vehicle size class calculating unit 13-2 may determine the size class of the second vehicle among the plurality of size classes. This will be described in more detail with reference to FIG. 8.

Figure 8:
FIG. 8 is a conceptual diagram illustrating a process of determining a size class of a second vehicle according to an exemplary embodiment of the invention.

FIG. 8 is a conceptual diagram illustrating a process of determining a size class of a second vehicle according to an exemplary embodiment of the invention. Referring to FIG. 8, the vehicle size class calculating unit 13-2 may classify a ratio value into a plurality of sections, and may calculate a size class of the vehicle based on a threshold table that matches the size class of the second vehicle to each of the plurality of sections.

As an example, the threshold table may be classified into three sections based on a first value and a second value, and a case in which the calculated ratio is smaller than the first value may be matched to a first size class corresponding to the compact car, a case in which the calculated ratio is greater than the first value and smaller than the second value may be matched to a second size class corresponding to the midsize car, and a case in which the calculated ratio is greater than the second value may be matched to a third size class corresponding to the full-sized car.

In this case, if the ratio calculated by the ratio calculating unit 13-1 is smaller than the first value, the vehicle size class calculating unit 13-2 may determine the size class of the second vehicle as the first size class. In addition, if the ratio calculated by the ratio calculating unit 13-1 is greater than the first value and smaller than the second value, the vehicle size class calculating unit 13-2 may determine the size class of the second vehicle as the second size class. In addition, if the ratio calculated by the ratio calculating unit 13-1 is greater than the second value, the vehicle size class calculating unit 13-2 may determine the size class of the second vehicle as the third size class. As an example, the first value may be 48% and the second value may be 60%.

Meanwhile, referring back to FIG. 3, the vehicle width calculating unit 13-3 may determine the width of the second vehicle based on the size class of the second vehicle. Specifically, the storing unit 14 may store the vehicle width for each of the plurality of size classes, and in this case, the vehicle width calculating unit 13-3 may determine the width VehicleW of the second vehicle by detecting a vehicle width corresponding to the determined size class among the vehicle widths pre-stored in the storing unit 14.

In addition, the apparatus 10 for measuring an inter-vehicle distance may calculate the distance between the photographing device 20 and the second vehicle 30 by dividing the focal length f of the photographing device 20 by the image width w of the second vehicle 30 and multiplying the width W of the second vehicle 30 calculated by the vehicle width calculating unit 13-3 as in Equation 2 described above.

Meanwhile, if the distance between the photographing device 20 and the second vehicle 30 is calculated, the distance calculating unit 13-4 of the apparatus 10 for measuring an inter-vehicle distance may calculate a distance value between the first vehicle in which the photographing device 20 is installed and the second vehicle 30 by appropriately correcting the distance value between the photographing device 20 and the second vehicle 30 for accurate calculation of the inter-vehicle distance. According to the present invention, the inter-vehicle distance may be more accurately measured by reducing an error of the inter-vehicle distance between the first vehicle and the second vehicle.

That is, in order to obtain the same distance value calculated based on Equation 2 for each of the compact car, the midsize car, and the full-sized car that are in the same distance in front of the first vehicle but have different vehicle widths, it is necessary to know the width of each vehicle. However, in the conventional image recognition and detection, it is impossible to check all the specifications according to all vehicle types, and therefore, since the inter-vehicle distance is conventionally measured by treating a vehicle width with a predetermined specific constant value without considering an actual vehicle width of a large number of vehicles having different widths (e.g., compact cars, midsize cars, and full-sized cars), there is a problem that the measured inter-vehicle distance value is not accurate.

However, according to the present invention, in order to solve such a problem, the front vehicle is classified into the compact car, the midsize car, and the full-sized car using the ratio between the image width of the front vehicle and the image width of the lane, and the inter-vehicle distance is measured based on an average width assigned to each of the compact car, the midsize car, and the full-sized car based on the classified result, thereby making it possible to reduce the error and more accurately measure the inter-vehicle distance.

Figure 9A:
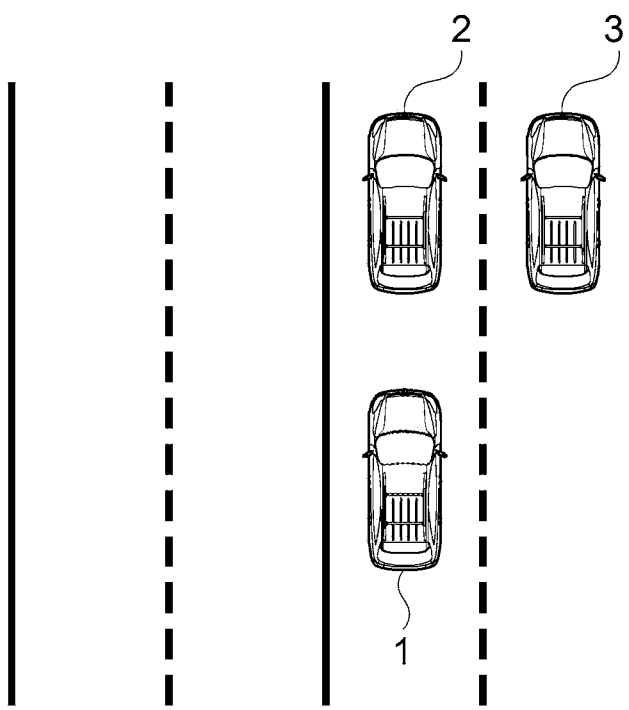
FIGS. 9A and 9B are conceptual diagrams illustrating a method for selecting a second vehicle, which is a distance measurement target, among a plurality of vehicles included in a driving image according to a driving state of a first vehicle according to an exemplary embodiment of the present invention.
Figure 9B:
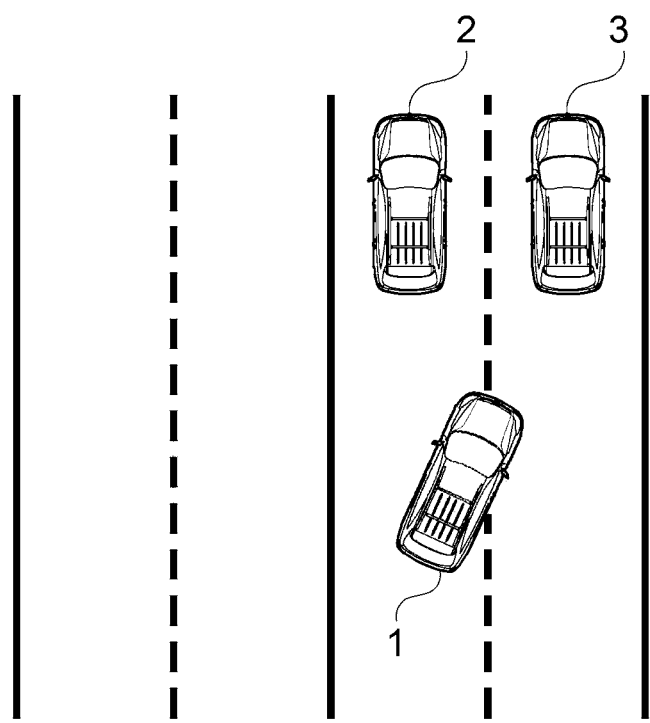

FIGS. 9A and 9B are conceptual diagrams illustrating a method for selecting a second vehicle, which is a distance measurement target, among a plurality of vehicles included in a driving image according to a driving state of a first vehicle according to an exemplary embodiment of the present invention.

Referring to FIG. 9A, a reference vehicle 1, which is the basis of the distance measurement, is being driven in a first lane, and as front vehicles, a first front vehicle 2 which is being driven in the same lane as that of the reference vehicle 1, and a second front vehicle 3 which is being driven in a lane that is not same as that of the reference vehicle 1 may be driving. In this case, a driver of the reference vehicle 1 only needs to be guided as to whether or not there is a risk of collision with the first front vehicle 2 located on the same lane, and does not need to determine the risk of collision with the second front vehicle 3. Therefore, according to an exemplary embodiment of the present invention, when the reference vehicle 1 is being driven on a specific lane, the detecting unit 12 may select the first front vehicle 2 located on the same lane as the reference vehicle 1 among the plurality of vehicles included in the driving image as a distance measurement target vehicle, and detect the selected target vehicle.

Referring to FIG. 9B, the reference vehicle 1, which is the basis of the distance measurement, is departing from the first lane, and as the front vehicles, the first front vehicle 2 which is being driven in the same lane as that of the reference vehicle 1, and the second front vehicle 3 which is being driven in the lane that is not same as that of the reference vehicle 1 may be driving. In this case, the driver of the reference vehicle 1 only needs to be guided as to whether or not there is a risk of collision with the second front vehicle 3 located in a driving direction, and does not need to determine the risk of collision with the first front vehicle 2. Therefore, according to an exemplary embodiment of the present invention, when the reference vehicle 1 is departing from the specific lane, the detecting unit 12 may select the second front vehicle 3 located on the lane to which a front surface of the reference vehicle 1 is directed among the plurality of vehicles included in the driving image as the distance measurement target vehicle, and detect the selected target vehicle.

Meanwhile, if the target vehicle, which is the distance measurement target, is detected, a distance between the reference vehicle and the target vehicle may be measured based on the method for measuring a distance described above.

FIG. 10 is a flowchart illustrating a method for measuring an inter-vehicle distance according to an exemplary embodiment of the present invention. Referring to FIG. 10, a driving image photographed by the photographing device of the first vehicle may be first acquired (S100).

In addition, a second vehicle may be detected from the driving image, and a ratio between an image width of the detected second vehicle and an image width of a lane in which the second vehicle is located may be calculated (S110). If the first vehicle is being driven on the lane, the second vehicle located on the same lane as the first vehicle may be detected among a plurality of vehicles included in the driving image in the operation of detecting the second vehicle. However, if the first vehicle is departing from the lane, the second vehicle located on a lane to which a front surface of the first vehicle is directed may be detected among the plurality of vehicles included in the driving image in the operation of detecting the second vehicle.

In addition, a size class of the second vehicle among a plurality of size classes may be determined based on the calculated ratio (S120). Here, the plurality of size classes may include at least two of a first size class corresponding to a compact car, a second size class corresponding to the midsize car, or a third size class corresponding to a full-sized car.

In addition, a width of the second vehicle may be determined based on the determined size class of the second vehicle (S130). Specifically, the present method further includes an operation of storing a width of the vehicle for each of the plurality of size classes, and in the operation (S130) of determining the width of the second vehicle, a width of the vehicle corresponding to the determined size class among the stored widths of the vehicle may be determined and the detected width of the vehicle may be determined as the width of the second vehicle.

In addition, a distance from a photographing device to the second vehicle may be calculated based on the determined width of the second vehicle, a focal length of the photographing device, and the image width of the second vehicle (S140). Specifically, a distance from a photographing device of the first vehicle to the second vehicle may be calculated based on Equation 2 described above.

FIG. 11 is a flowchart illustrating a method for calculating a ratio between an image width of a second vehicle and an image width of a lane in which the second vehicle is located according to an exemplary embodiment of the present invention. Referring to FIG. 11, the operation (S110) of calculating the ratio may include the following operations.

Specifically, the second vehicle, which is a distance measurement target, may be detected among the plurality of vehicles included in the driving image (S111).

In addition, a left line and a right line of the lane in which the second vehicle is being driven may be identified from the driving image (S112).

In addition, an image width between the identified left line and the identified right line may be determined as an image width of the lane in which the second vehicle is located (S113).

Meanwhile, a left boundary and a right boundary of the second vehicle may be identified from the detected image of the second vehicle (S114).

In addition, an image width between the identified left boundary and the identified right boundary may be determined as the image width of the second vehicle (S115).

Meanwhile, if the image width of the second vehicle and the image width of the lane in which the second vehicle is located are calculated by the operations described above, a ratio between the image width of the second vehicle and the image width of the lane in which the second vehicle is located may be calculated based on the determined image widths (S116).

Figure 12:
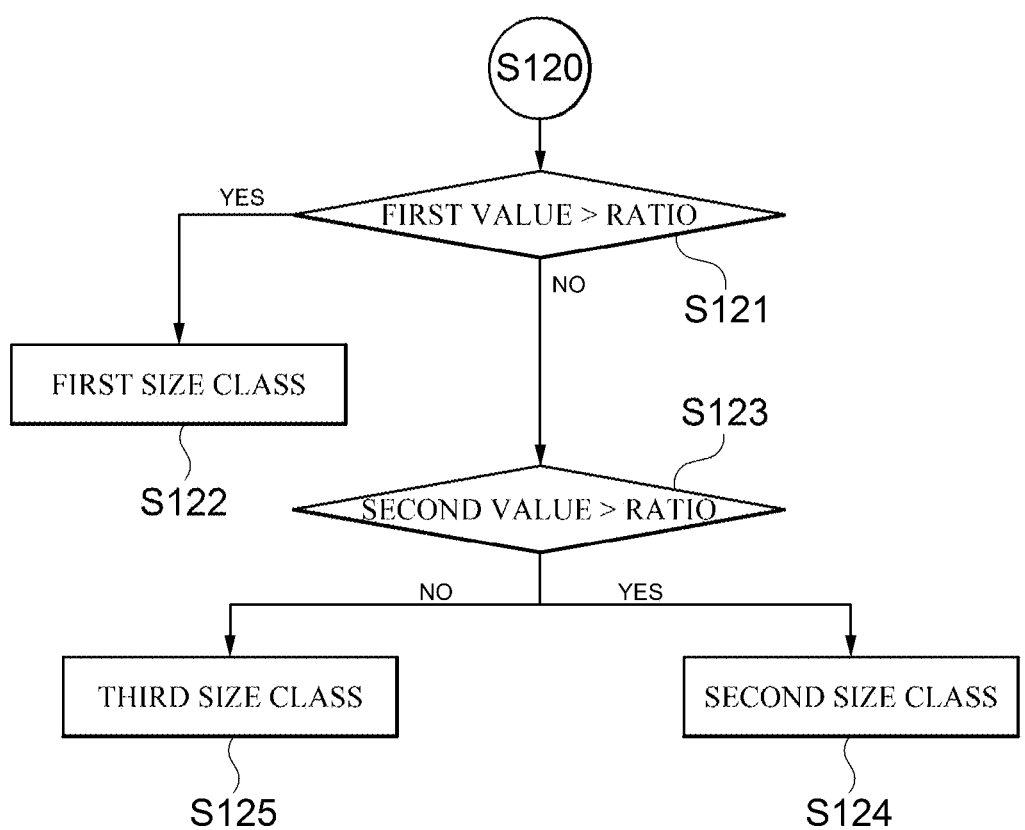
FIG. 12 is a flowchart illustrating a method for calculating a vehicle size class according to an exemplary embodiment of the present invention.

FIG. 12 is a flowchart illustrating a method for calculating a vehicle size class according to an exemplary embodiment of the present invention. Referring to FIG. 12, the operation (S120) of determining the size class of the second vehicle may include the following operations.

If the calculated ratio is smaller than a first value (YES in S121), the size class of the second vehicle may be determined as the first size class (S122).

If the calculated ratio is greater than the first value (NO in S121) and smaller than a second value (YES in S123), the size class of the second vehicle may be determined as the second size class (S124).

If the calculated ratio is greater than the second value (NO in S123), the size class of the second vehicle may be determined as the third size class (S125).

Meanwhile, the apparatus 10 for measuring an inter-vehicle distance may be implemented as an electronic device that outputs various guide information for assisting a driver's driving or as one module of a system for autonomous driving to perform a route guidance function. This will be described in more detail with reference to FIGS. 13 to 15.

Figure 13:
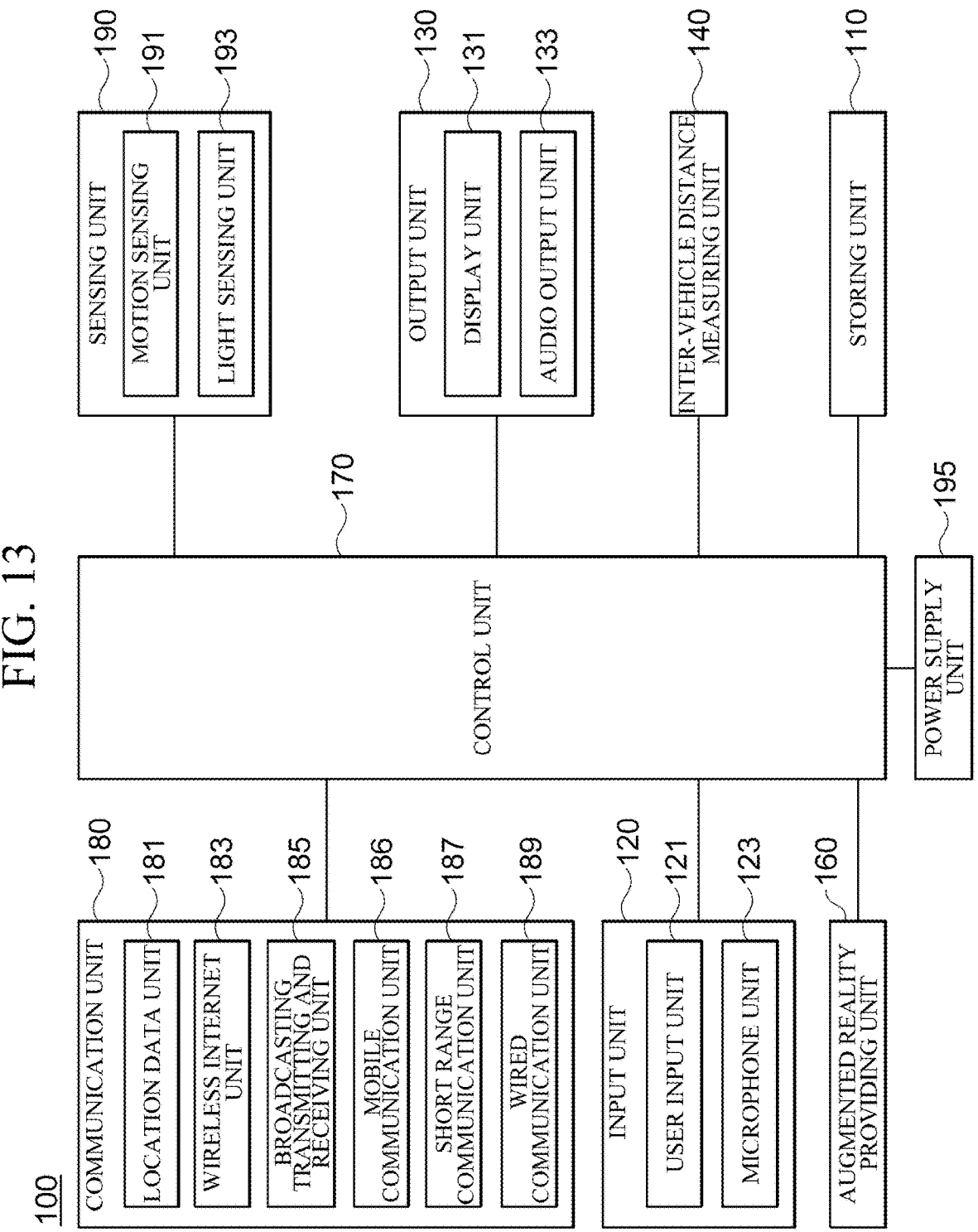
FIG. 13 is a block diagram illustrating an electronic device according to an exemplary embodiment of the present invention.

FIG. 13 is a block diagram illustrating an electronic device according to an exemplary embodiment of the present invention. Referring to FIG. 13, an electronic device 100 includes all or some of a storing unit 110, an input unit 120, an output unit 130, an inter-vehicle distance measuring unit 140, an augmented reality providing unit 160, a control unit 170, a communicating unit 180, a sensing unit 190, and a power supply unit 195.

Here, the electronic device 100 may be implemented as various devices such as a smartphone, a tablet computer, a notebook computer, a personal digital assistant (PDA), a portable multimedia player (PMP), a smart glasses, a project glasses, navigation, a car dash cam or a car video recorder, which is an image photographing device for a vehicle, and the like, that may provide driving related guidance to a driver of a vehicle, and may be provided in the vehicle.

The driving related guidance may include various kinds of guidance for assisting the driver' driving of the vehicle, such as route guidance, lane departure guidance, lane maintenance guidance, front vehicle start guidance, traffic light change guidance, front vehicle collision prevention guidance, lane change guidance, lane guidance, curve guidance, and the like.

Here, the route guidance may include augmented reality route guidance that performs the route guidance by combining various information such as a location, a direction, and the like of a user with an image acquired by photographing the front of the vehicle that is being driven and two-dimensional (2D) or three-dimensional (3D) route guidance that performs the route guidance by combining various information such as the location, the direction, and the like of the user with 2D or 3D map data.

Also, the route guidance may include an aerial map route guidance that performs the route guidance by combining various information such as the location, the direction, and the like of the user with aerial map data. Here, the route guidance may be interpreted as a concept including route guidance in the case in which the user walks or runs and moves as well as in the case in which the user gets in the vehicle and then drives the vehicle.

In addition, the lane departure guidance may be to guide whether or not the vehicle that is being driven has departed from the lane.

In addition, the lane maintenance guidance may be to guide the vehicle to return to an original driving lane.

In addition, the front vehicle start guidance may be to guide whether to start the vehicle located in front of the vehicle being stopped. Here, the front vehicle start guidance may be performed using the inter-vehicle distance calculated by the inter-vehicle distance measuring unit 140.

In addition, the traffic light change guidance may be to guide whether a signal of a traffic light located in front of the vehicle that is stopped is changed. As an example, the traffic light change guidance may be to guide that a state of the traffic light is changed from a red traffic light indicating a stop signal to a green traffic light indicating a start signal.

In addition, the front vehicle collision prevention guidance may be to guide that a distance between a vehicle that is being stopped or driving and a vehicle located in front of the vehicle is within a predetermined distance in order to prevent collision between the above-mentioned vehicles when the distance between the vehicle that is being stopped or driving and the vehicle located in front of the vehicle is within the predetermined distance. Here, the front vehicle collision prevention guidance may be performed using the inter-vehicle distance calculated by the inter-vehicle distance measuring unit 140.

In addition, the lane change guidance may be to guide a change from a lane in which the vehicle is located to a different lane in order to guide a route up to a destination.

In addition, the lane guidance may be to guide a lane in which the vehicle is currently located.

In addition, the curve guidance may be to guide that the road on which the vehicle will drive after a predetermined time is a curve.

A driving related image such as a front image of the vehicle that may provide a variety of guidance may be photographed by a camera mounted on the vehicle or a camera of the smartphone. Here, the camera may be a camera formed integrally with the electronic device 100 mounted in the vehicle to photograph the front of the vehicle.

As another example, the camera may be a camera mounted on the vehicle separately from the electronic device 100 to photograph the front of the vehicle. In this case, the camera may be a separate image photographing device for a vehicle mounted toward the front of the vehicle, and the electronic device 100 may receive a photographed image through wired/wireless communication with the separately mounted image photographing device for a vehicle, or receive the photographed image when a storage medium storing the photographed image of the image photographing device for a vehicle is inserted into the electronic device 100.

Hereinafter, the electronic device 100 according to an exemplary embodiment of the present invention will be described in more detail based on the above-mentioned content.

The storing unit 110 serves to store various data and applications necessary for the operation of the electronic device 100. In particular, the storing unit 110 may store data necessary for the operation of the electronic device 100, for example, an operating system (OS), a route search application, map data, and the like. In addition, the storing unit 110 may store data generated by the operation of the electronic device 100, for example, searched route data, a received image, and the like.

Here, the storing unit 110 may be implemented as a detachable type of storing element such as a universal serial bus (USB) memory, or the like, as well as an embedded type of storing element such as a random access memory (RAM), a flash memory, a read only memory (ROM), an erasable programmable ROM (EPROM), an electronically erasable and programmable ROM (EEPROM), a register, a hard disk, a removable disk, a memory card, a universal subscriber identity module (USIM), or the like.

The input unit 120 serves to convert a physical input from the outside of the electronic device 100 into a specific electrical signal. Here, the input unit 120 may include all or some of a user input unit 121 and a microphone unit 123.

The user input unit 121 may receive a user input such as a touch, a push operation, or the like. Here, the user input unit 121 may be implemented using at least one of the forms of various buttons, a touch sensor receiving a touch input, and a proximity sensor receiving an approaching motion.

The microphone unit 123 may receive a speech of the user and a sound generated from the inside and the outside of the vehicle.

The output unit 130 is a device that outputs data of the electronic device 100 to the user as an image and/or speech.

Here, the output unit 130 may include all or some of a display unit 131 and an audio output unit 133.

The display unit 131 is a device for outputting data that may be visually recognized by the user. The display unit 131 may be implemented as a display unit provided on a front surface of a housing of the electronic device 100. In addition, the display unit 131 may be formed integrally with the electronic device 100 to output visual recognition data, or may be installed separately from the electronic device 100 like a head-up display (HUD) to output the visual recognition data.

The audio output unit 133 is a device for outputting data that may be acoustically recognized by the electronic device 100. The audio output unit 133 may be implemented as a speaker that expresses data to be reported to the user of the electronic device 100 as sound.

The inter-vehicle distance measuring unit 140 may perform the function of the apparatus 10 for measuring an inter-vehicle distance described above.

The augmented reality providing unit 160 may provide an augmented reality view mode. Here, augmented reality is a method of visually overlapping and providing additional information (e.g., a graphic element indicating a point of interest (POI), a graphic element guiding a front vehicle collision risk, a graphic element indicating an inter-vehicle distance, a graphic element guiding a curve, various additional information for assisting safe driving of the driver, and the like) with and on a screen including a real world actually viewed by the user.

Such an augmented reality providing unit 160 may include all or some of a calibration unit, a 3D space generating unit, an object generating unit, and a mapping unit.

The calibration unit may perform calibration for estimating camera parameters corresponding to the camera from the photographed image photographed by the camera. Here, the camera parameters may be parameters configuring a camera matrix, which is information indicating a relationship between a real space and a photograph, and may include camera extrinsic parameters and camera intrinsic parameters.

The 3D space generating unit may generate a virtual 3D space based on the photographed image photographed by the camera. Specifically, the 3D space generating unit may generate the virtual 3D space by applying the camera parameters estimated by the calibration unit to a 2D photographed image.

The object generating unit may generate objects for guidance on the augmented reality, for example, a front vehicle collision prevention guidance object, a route guidance object, a lane change guidance object, a lane departure guidance object, a curve guidance object, and the like.

The mapping unit may map the object generated by the object generating unit to the virtual 3D space generated by the 3D space generating unit. Specifically, the mapping unit may determine a location of the object generated by the object generating unit in the virtual 3D space, and perform mapping of the object to the determined position.

Meanwhile, the communicating unit 180 may be provided in order for the electronic device 100 to communicate with other devices. The communicating unit 180 may include all or some of a location data unit 181, a wireless Internet unit 183, a broadcasting transmitting and receiving unit 185, a mobile communicating unit 186, a short range communicating unit 187, and a wired communicating unit 189.

The location data unit 181 is a device for acquiring location data through a global navigation satellite system (GNSS). The GNSS means a navigation system that may calculate a location of a receiving terminal using a radio wave signal received from a satellite. A detailed example of the GNSS may include a global positioning system (GPS), Galileo, a global orbiting navigational satellite system (GLONASS), COMPASS, an Indian regional navigational satellite system (IRNSS), a quasi-zenith satellite system (QZSS), and the like, depending on an operating subject of the GNSS. The location data unit 181 of the system according to an exemplary embodiment of the present invention may acquire the location data by receiving GNSS signals served in a zone in which the electronic device 100 is used. Alternatively, the location data unit 181 may also acquire the location data through communication with a base state or an access point (AP) in addition to the GNSS.

The wireless Internet unit 183 is a device for accessing wireless Internet to acquire or transmit data. The wireless Internet unit 183 may access the Internet network through various communication protocols defined to perform transmission and reception of wireless data of a wireless local area network (WLAN), a wireless broadband (Wibro), a world interoperability for microwave access (Wimax), a high speed downlink packet access (HSDPA), or the like.

The broadcasting transmitting and receiving unit 185 is a device for transmitting and receiving broadcasting signals through various broadcasting systems. The broadcasting system that may transmit and receive the broadcasting signals through the broadcasting transmitting and receiving unit 185 may be a digital multimedia broadcasting terrestrial (DMBT), a digital multimedia broadcasting satellite (DMBS), a media forward link only (MediaFLO), a digital video broadcast handheld (DVBH), an integrated services digital broadcast terrestrial (ISDBT), or the like. The broadcasting signals transmitted and received through the broadcasting transmitting and receiving unit 185 may include traffic data, living data, and the like.

The mobile communicating unit 186 may access a mobile communication network according to various mobile communication protocols such as 3rd generation (3G), 3rd generation partnership project (3GPP), long term evolution (LTE), and the like to communicate speech and data.

The short range communicating unit 187 is a device for short range communication. The short range communicating unit 187 may perform communication through Bluetooth, radio frequency identification (RFID), infrared data association (IrDA), ultra wideband (UWB), ZigBee, near field communication (NFC), wireless-fidelity (Wi-Fi), or the like, as described above.

The wired communicating unit 189 is an interface device that may connect the electronic device 100 to other devices in a wired scheme. The wired communicating unit 189 may be a USB module that may perform communication through a USB port.

The communicating unit 180 may communicate with other devices using at least one of the location data unit 181, the wireless Internet unit 183, the broadcasting transmitting and receiving unit 185, the mobile communicating unit 186, the short range communicating unit 187, and the wired communicating unit 189.

As an example, in the case in which the electronic device 100 does not include the camera function, the image photographed by the image photographing device for a vehicle such as the car dash cam or the car video recorder may be received using at least one of the short range communicating unit 187 and the wired communicating unit 189.

As another example, in the case in which the electronic device communicates with a plurality of devices, the electronic device may communicate with one of the plurality of devices through the short range communicating unit 187, and communicate with the other of the plurality of devices through the wired communicating unit 189.

The sensing unit 190 is a device that may detect a current state of the electronic device 100. The sensing unit 190 may include all or some of a motion sensing unit 191 and a light sensing unit 193.

The motion sensing unit 191 may detect a motion of the electronic device 100 in a 3D space. The motion sensing unit 191 may include a tri-axial terrestrial magnetism sensor and a tri-axial acceleration sensor. Motion data acquired through the motion sensing unit 191 may be combined with the location data acquired through the location data unit 181 to more accurately calculate a trajectory of the vehicle to which the electronic device 100 is attached.

The light sensing unit 193 is a device for measuring peripheral illuminance of the electronic device 100. Brightness of the display unit 131 may be changed so as to correspond to peripheral brightness using illuminance data acquired through the light sensing unit 193.

The power supply unit 195 is a device for supplying power necessary for an operation of the electronic device 100 or operations of other devices connected to the electronic device 100. The power supply unit 195 may be a device that receives power from a battery embedded in the electronic device 100 or an external power supply such as the vehicle or the like. In addition, the power supply unit 195 may be implemented as the wired communicating unit 189 or a device that is wirelessly supplied with the power, depending on a scheme in which the power is supplied.

The control unit 170 controls an overall operation of the electronic device 100. Specifically, the control unit 170 may control all or some of the storing unit 110, the input unit 120, the output unit 130, the inter-vehicle distance measuring unit 140, the augmented reality providing unit 160, the communicating unit 180, the sensing unit 190, and the power supply unit 195.

Specifically, the control unit 170 may control the output unit 130 to output the front vehicle collision warning according to the inter-vehicle distance calculated by the inter-vehicle distance measuring unit 140. As an example, the output unit 130 may include the display unit 131 that combines the photographed driving image with a guidance object to output an augmented reality image. In this case, the control unit 170 may generate a guidance object for a front vehicle collision warning and control the display unit 131 to display the generated guidance object for front vehicle collision warning superimposed on a front vehicle display region of the augmented reality image. Here, the guidance objects to be displayed may be displayed as different guidance objects according to a collision risk level corresponding to a distance difference between the first vehicle and the second vehicle. As an example, when the distance difference between the first vehicle and the second vehicle is divided into a plurality of levels, the control unit 170 may display a guidance object for guiding a first risk level when the inter-vehicle distance is smaller than a first value, may display a guidance object for guiding a second risk level having the degree of risk higher than the first risk level when the inter-vehicle distance is greater than the first value and smaller than a second value, and may display a guidance object for guiding a third risk level having the degree of risk greater than the second risk level when the inter-vehicle distance is greater than the second value.

Figure 14:
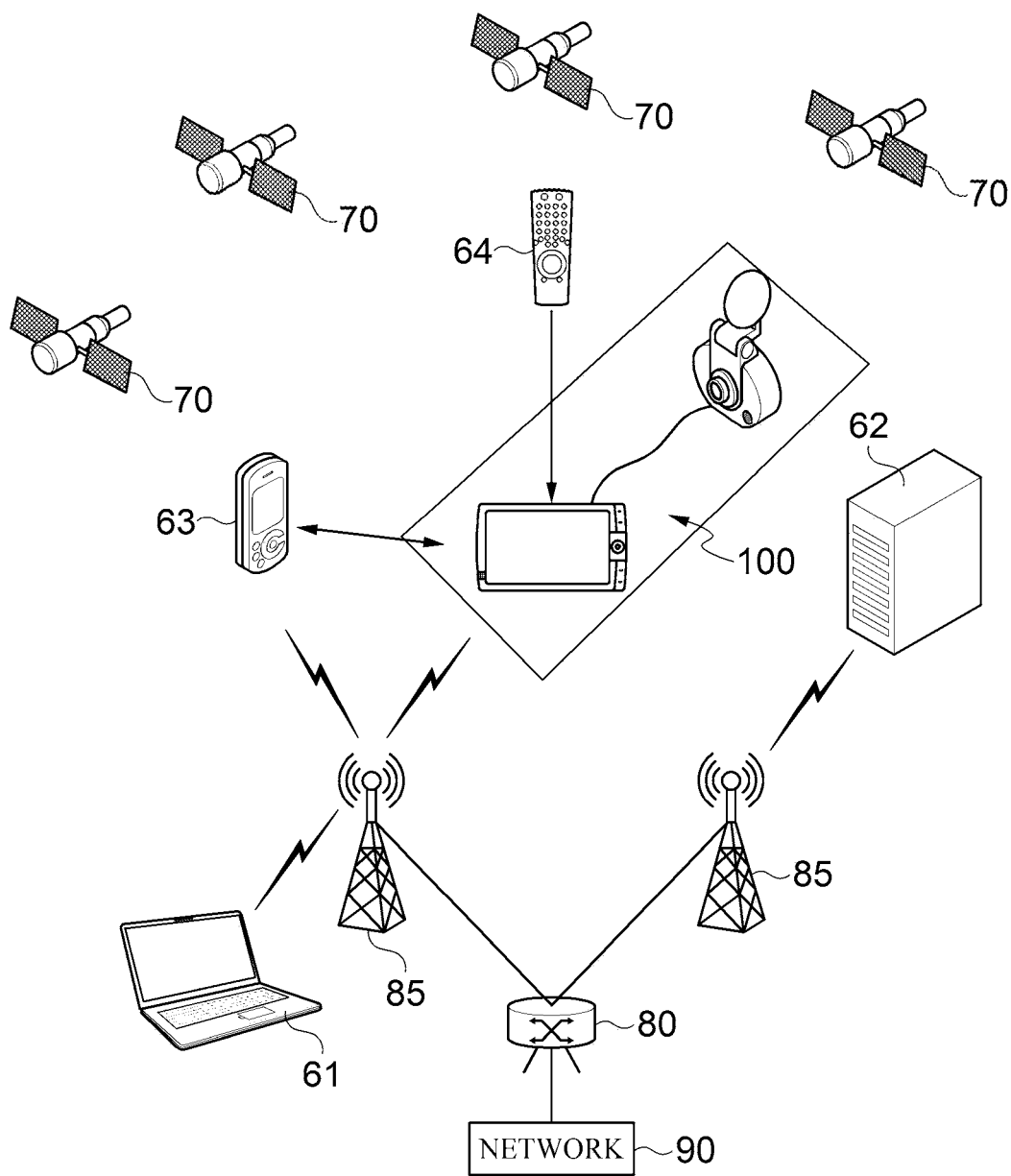
FIG. 14 is a diagram illustrating a system network connected to the electronic device according to an exemplary embodiment of the present invention.

FIG. 14 is a diagram illustrating a system network connected to the electronic device according to an exemplary embodiment of the present invention. Referring to FIG. 14, the electronic device 100 according to an exemplary embodiment of the present invention may be implemented as various devices provided in the vehicle, such as the navigation, the image photographing device for a vehicle, the smartphone, other augmented reality interface providing devices for a vehicle, or the like, and may be connected to various communication networks and other electronic devices 61 to 64.

In addition, the electronic device 100 may calculate the current location and the current time zone by interlocking a GPS module according to the radio wave signal received from a satellite 70.

Each satellite 70 may transmit L band frequencies of different frequency bands. The electronic device 100 may calculate the current location based on the time taken for the L band frequency transmitted from each satellite 70 to reach the electronic device 100.

Meanwhile, the electronic device 100 may wirelessly access a network 90 through an access control router (ACR) 80, a radio access station (RAS) 85, an access point (AP), and the like, via the communicating unit 180. When the electronic device 100 accesses the network 90, the electronic device 100 may indirectly access other electronic devices 61 and 62 that access the network 90 to exchange data.

Meanwhile, the electronic device 100 may also indirectly access the network 90 through another device 63 having a communication function. For example, when the electronic device 100 does not have a module that may access the network 90, the electronic device 100 may communicate with another device 63 having the communication function through a short range communication module, or the like.

Figure 15:
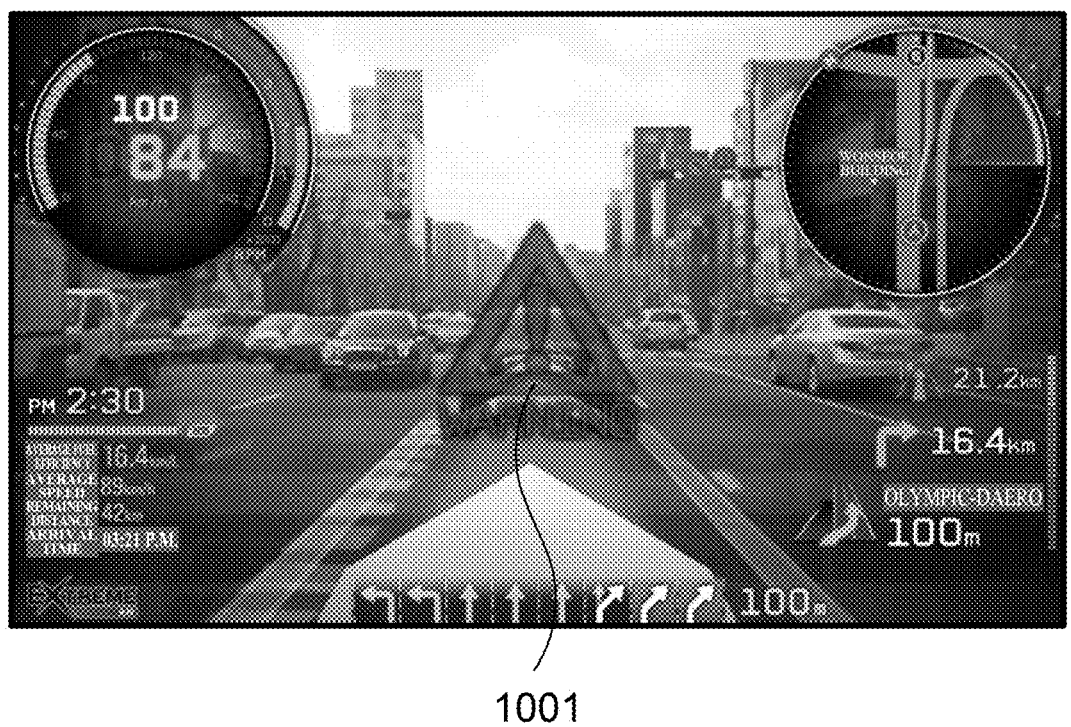
FIG. 15 is a diagram illustrating a vehicle collision prevention guide screen of the electronic device according to an exemplary embodiment of the present invention.

FIG. 15 is a diagram illustrating a vehicle collision prevention guide screen of the electronic device according to an exemplary embodiment of the present invention. Referring to FIG. 15, the electronic device 100 may generate a guidance object indicating the degree of vehicle collision risk and output the generated guidance object 1001 through the augmented reality.

Here, the guidance object 1001 may be an object for guiding that the user needs attention. That is, the vehicle collision prevention guide may be a guide that the distance between the vehicle and the front vehicle is narrowed within a predetermined distance and thus there is a risk of collision with the front vehicle. In the present exemplary embodiment, the guidance object 1001 may be implemented as a texture image and be expressed through the augmented reality. Therefore, the driver may easily recognize a road on which the own vehicle is being driven.

In addition, the electronic device 100 may also output the guidance object 1001 through speech.

Figure 16:
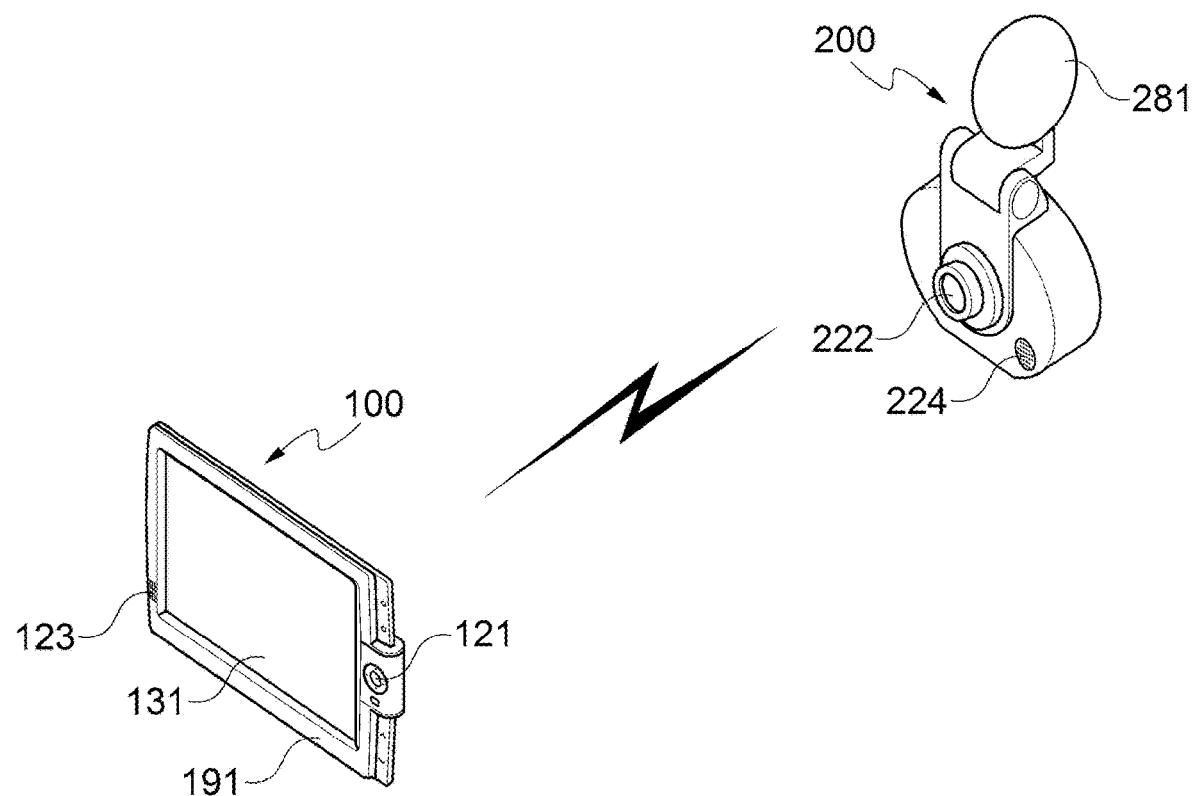
FIG. 16 is a diagram illustrating an implementation form of a case in which the electronic device according to an exemplary embodiment of the present invention does not include a photographing unit.

FIG. 16 is a diagram illustrating an implementation form of a case in which the electronic device according to an exemplary embodiment of the present invention does not include a photographing unit. Referring to FIG. 16, the electronic device 100 and an image photographing device 200 for a vehicle which is separately provided may configure a system according to an exemplary embodiment of the present invention using a wired/wireless communication scheme.

The electronic device 100 may include the display unit 131, the user input unit 121, and the microphone 123 which are provided on a front surface of a housing 191.

The image photographing device 200 for a vehicle may include a camera 222, a microphone 224, and an attaching part 281.

Figure 17:
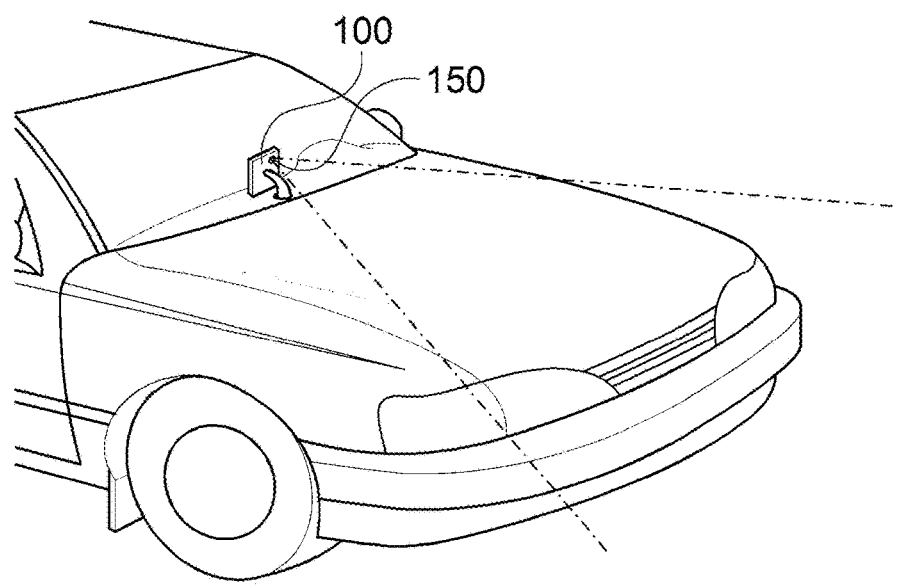
FIG. 17 is a diagram illustrating an implementation form of a case in which the electronic device according to an exemplary embodiment of the present invention includes the photographing unit.

FIG. 17 is a diagram illustrating an implementation form of a case in which the electronic device according to an exemplary embodiment of the present invention includes the photographing unit. Referring to FIG. 17, in the case in which the electronic device 100 includes a photographing unit 150, the photographing unit 150 of the electronic device unit 100 may be a device for photographing the front of the vehicle and allowing the user to recognize a display portion of the electronic device 100. Therefore, the system according to an exemplary embodiment of the present invention may be implemented.

Figure 18:
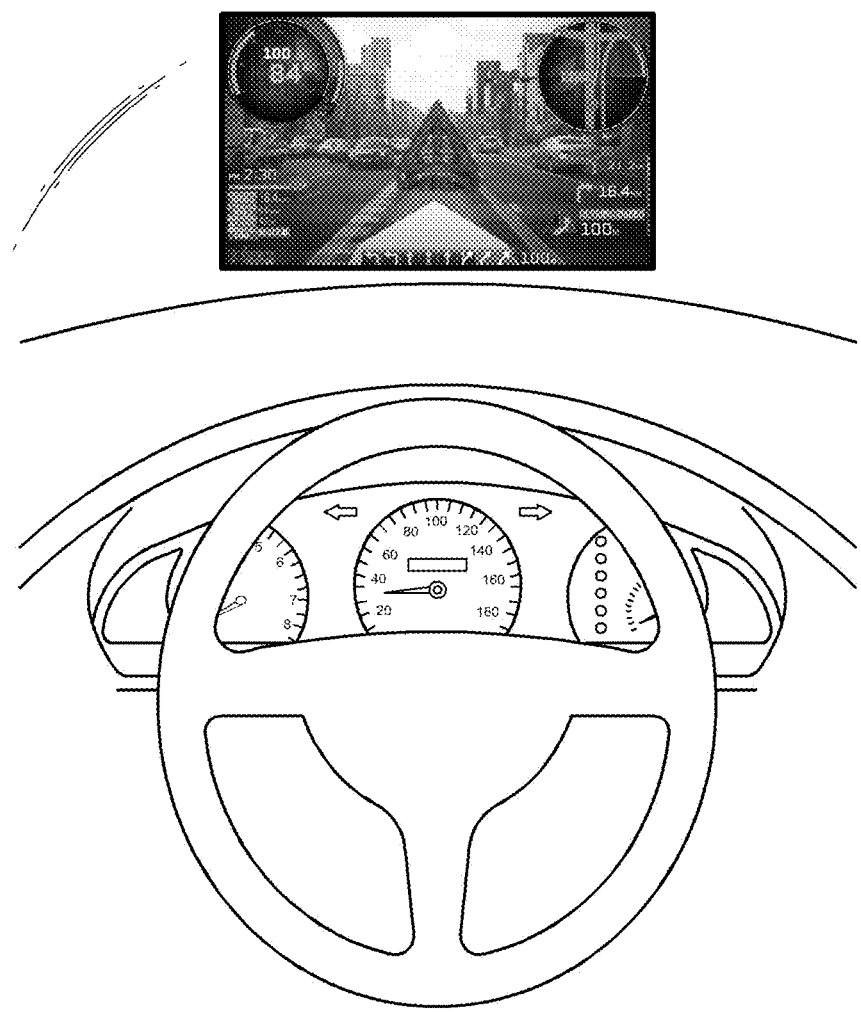
FIG. 18 is a diagram illustrating an implementation form using a head-up display (HUD) according to an exemplary embodiment of the present invention.

FIG. 18 is a diagram illustrating an implementation form using a head-up display (HUD) according to an exemplary embodiment of the present invention. Referring to FIG. 18, the HUD may display an augmented reality guide screen on the head-up display through wired/wireless communication with other devices.

As an example, the augmented reality may be provided through the HUD using a front glass of the vehicle, an image overlay using a separate image output device, or the like, and the augmented reality providing unit 160 may generate an interface image overlaid on the reality image or the glass as described above. In this way, augmented reality navigation or vehicle infotainment system may be implemented.

Figure 19:
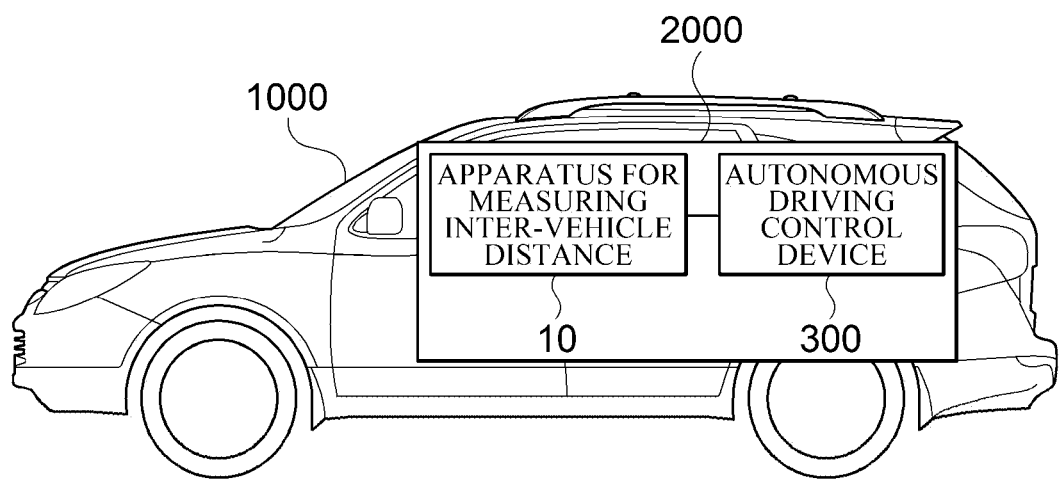
FIG. 19 is a block diagram illustrating an autonomous driving system according to an exemplary embodiment of the present invention.

FIG. 19 is a block diagram illustrating an autonomous driving system according to an exemplary embodiment of the present invention. Referring to FIG. 19, an autonomous driving system 2000 provided in a vehicle 1000 may include the apparatus 10 for measuring an inter-vehicle distance and an autonomous driving control device 300.

Here, the apparatus 10 for measuring an inter-vehicle distance may measure a distance between the vehicle 1000 and the front vehicle and transmit the measured inter-vehicle distance value to the autonomous driving control device 300.

In this case, the autonomous driving control device 300 may control the autonomous driving of the vehicle 1000 based on inter-vehicle distance information acquired from the apparatus 10 for measuring an inter-vehicle distance. Specifically, when the acquired inter-vehicle distance is smaller than a predetermined distance, the autonomous driving control device 300 may control a speed of the vehicle 1000 to be reduced from a current speed to a predetermined speed or control various units (brake, steering wheel, etc.) provided in the vehicle 1000 to stop the vehicle 1000. That is, the vehicle 1000 may control the autonomous driving of the vehicle 1000 based on the inter-vehicle distance acquired from the apparatus 10 for measuring an inter-vehicle distance.

In addition, the autonomous driving control device 300 according to another exemplary embodiment of the present invention may also control a driving speed by generating a command to the driving device of the vehicle 1000 so that the inter-vehicle distance acquired from the apparatus 10 for measuring an inter-vehicle distance maintains a predetermined distance.

In addition, the autonomous driving control device 300 according to another exemplary embodiment of the present invention may also control the speed of the vehicle 1000 by maintaining the distance between the vehicle 1000 and the front vehicle to a constant distance so that the detected ratio between the width of the front vehicle and the width of the lane in which the front vehicle is located maintains a constant value.

Meanwhile, the method for measuring an inter-vehicle distance according to another exemplary embodiment of the present invention may be configured by a module in a control device 2100 of the autonomous vehicle 2000. That is, a memory 2122 and a processor 2124 of the control device 2100 may implement the method for measuring an inter-vehicle distance according to the present invention as software.

Hereinafter, a more detailed description will be provided with reference to FIG. 20.

Figure 20:
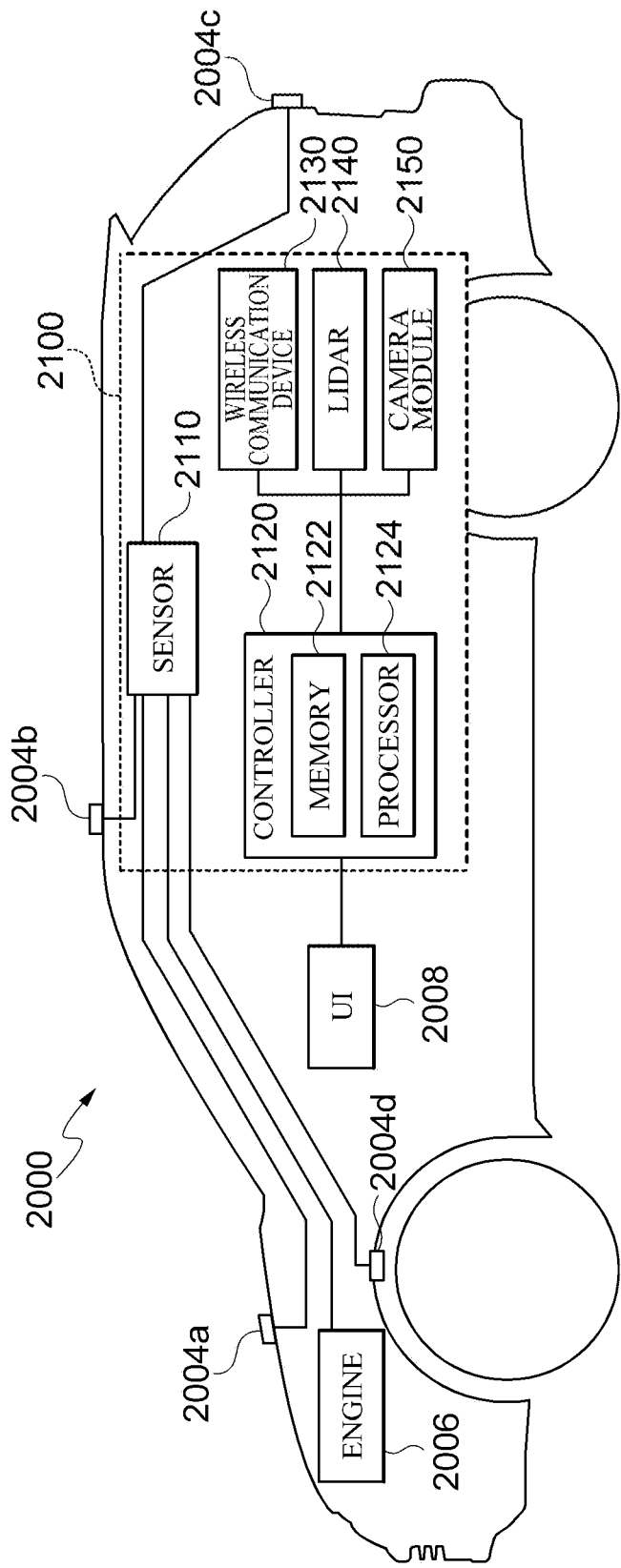
FIG. 20 is a block diagram illustrating components of an autonomous vehicle according to an exemplary embodiment of the present invention.

FIG. 20 is a block diagram illustrating components of an autonomous vehicle 2000 according to an exemplary embodiment of the present invention.

Referring to FIG. 20, the autonomous vehicle 2000 according to the present exemplary embodiment may include the control device 2100, sensing modules 2004a, 2004b, 2004c, and 2004d, an engine 2006, and a user interface 2008.

In the present exemplary embodiment, the control device 2100 may include a controller 2120 including the memory 2122 and the processor 2124, a sensor 2110, a wireless communication device 2130, a LIDAR 2140, and a camera module 2150.

In the present exemplary embodiment, the controller 2120 may be configured at the time of manufacture by the manufacturer of the vehicle or may be additionally configured to perform a function of autonomous driving after the manufacture. Alternatively, a component for performing a continuous additional function through an upgrade of the controller 2120 configured at the time of manufacture may be included.

The controller 2120 may transmit control signals to the sensor 2110, the engine 2006, the user interface 2008, the wireless communication device 2130, the LIDAR 2140, and the camera module 2150 that are included as other components in the vehicle. In addition, although not illustrated, the controller 2120 may also transmit the control signals to an accelerator, a braking system, a steering device, or a navigation device associated with driving of the vehicle.

In the present exemplary embodiment, the controller 2120 may control the engine 2006, for example, may detect a speed limit of the road in which the autonomous vehicle 2000 is being driven and control the engine 2006 such that the driving speed does not exceed the speed limit, or may control the engine 2006 to accelerate the driving speed of the autonomous vehicle 2000 within a range not exceeding the speed limit. In addition, the controller 2120 may detect a distance to the vehicle located in front of the autonomous vehicle 2000 while driving of the autonomous vehicle 2000, and control the engine 2006 to control the driving speed according to the inter-vehicle distance. In addition, if the sensing modules 2004a, 2004b, 2004c, and 2004d detect an environment outside the vehicle and transmit the detected environment to the sensor 2110, the controller 2120 may receive the transmitted environment and generate a signal for controlling the engine 2006 or the steering device (not illustrated) to control the driving of the vehicle.

If there is another vehicle or obstruction in front of the vehicle, the controller 2120 may control the engine 2006 or the braking system to decelerate the driving vehicle, and control a trajectory, a driving route, and a steering angle in addition to the speed. Alternatively, the controller 2120 may control the driving of the vehicle by generating a necessary control signal according to recognition information of other external environments such as a driving line, a driving signal, or the like of the vehicle.

In addition to generating its own control signal, the controller 2120 may also control the driving of the vehicle by performing communication with a peripheral vehicle or a central server and transmitting a command for controlling the peripheral devices through the received information.

In the present exemplary embodiment, the controller 2120 may include the memory 2122 and the processor 2124. The processor 2124 may execute software stored in the memory 2122 according to the control signal of the controller 2120. Specifically, the controller 2120 may store data and instructions for performing the method for measuring an inter-vehicle distance according to the present invention in the memory 2122, and the instructions may be executed by the processor 2124 to implement one or more methods disclosed herein.

In this case, the memory 2122 may be stored in a recording medium executable by a non-volatile processor 2124. The memory 2122 may store software and data through appropriate internal and external devices. The memory 2122 may include a random access memory (RAM), a read only memory (ROM), a hard disk, and a memory 2122 device connected to a dongle.

The memory 2122 may store at least an operating system (OS), a user application, and executable instructions. The memory 2122 may also store application data and array data structures.

The processor 2124 may be a controller, a microcontroller, or a state machine as a microprocessor or a suitable electronic processor.

The processor 2124 may be implemented in a combination of computing devices, and the computing device may be a digital signal processor, a microprocessor, or an appropriate combination thereof.

In addition, in the present exemplary embodiment, the control device 2100 may monitor the inside and outside features of the autonomous vehicle 2000 and detect a state by using at least one sensor 2110.

The sensor 2110 may be configured of at least one sensing module 2004, and the sensing module 2004 may be implemented at a specific position of the autonomous vehicle 2000 according to a sensing purpose. The sensing module 2004 may be located at the bottom, rear end, front end, upper end, or side end of the autonomous vehicle 2000, and may also be located at an internal part or a tire of the vehicle.

In this way, the sensing module 2004 may detect information related to driving, such as the engine 2006, the tire, the steering angle, the speed, and a weight of the vehicle, as internal information of the vehicle. In addition, at least one sensing module 2004 may include an acceleration sensor 2110, a gyroscope, an image sensor 2110, a RADAR, an ultrasonic sensor, a LiDAR sensor, and the like, and may detect motion information of the autonomous vehicle 2000.

The sensing module 2004 may receive, as external information, specific data on external environmental conditions such as state information of the road on which the autonomous vehicle 2000 is located, peripheral vehicle information, weather, and the like, and may also detect a parameter of the vehicle accordingly. The detected information may be stored in the memory 2122 either temporarily or for a long time, depending on the purpose.

In the present exemplary embodiment, the sensor 2110 may combine and collect information of the sensing modules 2004 for collecting information generated inside and outside the autonomous vehicle 2000.

The control device 2100 may further include the wireless communication device 2130.

The wireless communication device 2130 is configured to implement wireless communication between the autonomous vehicles 2000. For example, the wireless communication device 2130 allows the autonomous vehicle 2000 to communicate with a user's mobile phone or other wireless communication device 2130, another vehicle, a central device (traffic control device), a server, and the like. The wireless communication device 2130 may transmit and receive a wireless signal according to an access wireless protocol. The wireless communication protocol may be Wi-Fi, Bluetooth, long-term evolution (LTE), code division multiple access (CDMA), wideband code division multiple access (WCDMA), or global systems for mobile communications (GSM), but the communication protocol is not limited thereto.

In addition, in the present exemplary embodiment, the autonomous vehicle 2000 may also implement vehicle-to-vehicle communication through the wireless communication device 2130. That is, the wireless communication device 2130 may communicate with other vehicles on the road through vehicle-to-vehicle communication (V2V). The autonomous vehicle 2000 may transmit and receive information such as driving warning and traffic information through vehicle-to-vehicle communication, and may also request information from or receive information from another vehicle. For example, the wireless communication device 2130 may perform the V2V communication using a dedicated short-range communication (DSRC) device or a cellular-V2V (C-V2V) device. In addition, in addition to the vehicle-to-vehicle communication, vehicle to everything communication (V2X) between the vehicle and other objects (e.g., an electronic device carried by a pedestrian) may be implemented through the wireless communication device 2130.

In addition, the control device 2100 may include the LIDAR device 2140. The LIDAR device 2140 may detect an object around the autonomous vehicle 2000 during operation using data sensed by a LIDAR sensor. The LIDAR device 2140 may transmit the detected information to the controller 2120, and the controller 2120 may operate the autonomous vehicle 2000 according to the detected information. For example, if the detected information includes a front vehicle which is being driven at low speed, the controller 2120 may instruct the vehicle to reduce the speed through the engine 2006. Alternatively, the controller 2120 may instruct the vehicle to reduce the speed of entry according to a curvature of a curve in which the vehicle enters.

The control device 2100 may further include the camera module 2150. The controller 2120 may extract object information from an external image photographed by the camera module 2150 and allow the controller 2120 to process information about the object information.

In addition, the control device 2100 may further include imaging devices for recognizing an external environment. In addition to the LIDAR 2140, RADAR, a GPS device, odometry and other computer vision devices may be used, and these devices may be selectively or simultaneously operated as needed to allow more precise detection.

The autonomous vehicle 2000 may further include the user interface 2008 for user input to the control device 2100 described above. The user interface 2008 may allow a user to input information with appropriate interaction. For example, the user interface 2008 may be implemented as a touch screen, a keypad, an operation button, or the like. The user interface 2008 may transmit an input or a command to the controller 2120 and the controller 2120 may perform a control operation of the vehicle in response to the input or the command.

In addition, the user interface 2008 may allow a device outside the autonomous vehicle 2000 to communicate with the autonomous vehicle 2000 through the wireless communication device 2130. For example, the user interface 2008 may allow the autonomous vehicle 2000 to interact with a mobile phone, tablet, or other computer device.

Further, in the present exemplary embodiment, although the autonomous vehicle 2000 has been described as including the engine 2006, it is also possible to include other types of propulsion systems. For example, the vehicle may be driven by electrical energy and may be driven through a hybrid system of hydrogen energy or a combination thereof. Therefore, the controller 2120 may include a propulsion mechanism according to the propulsion system of the autonomous vehicle 2000, and provide control signals according to the propulsion mechanism to the components of each propulsion mechanism.

Figure 21:
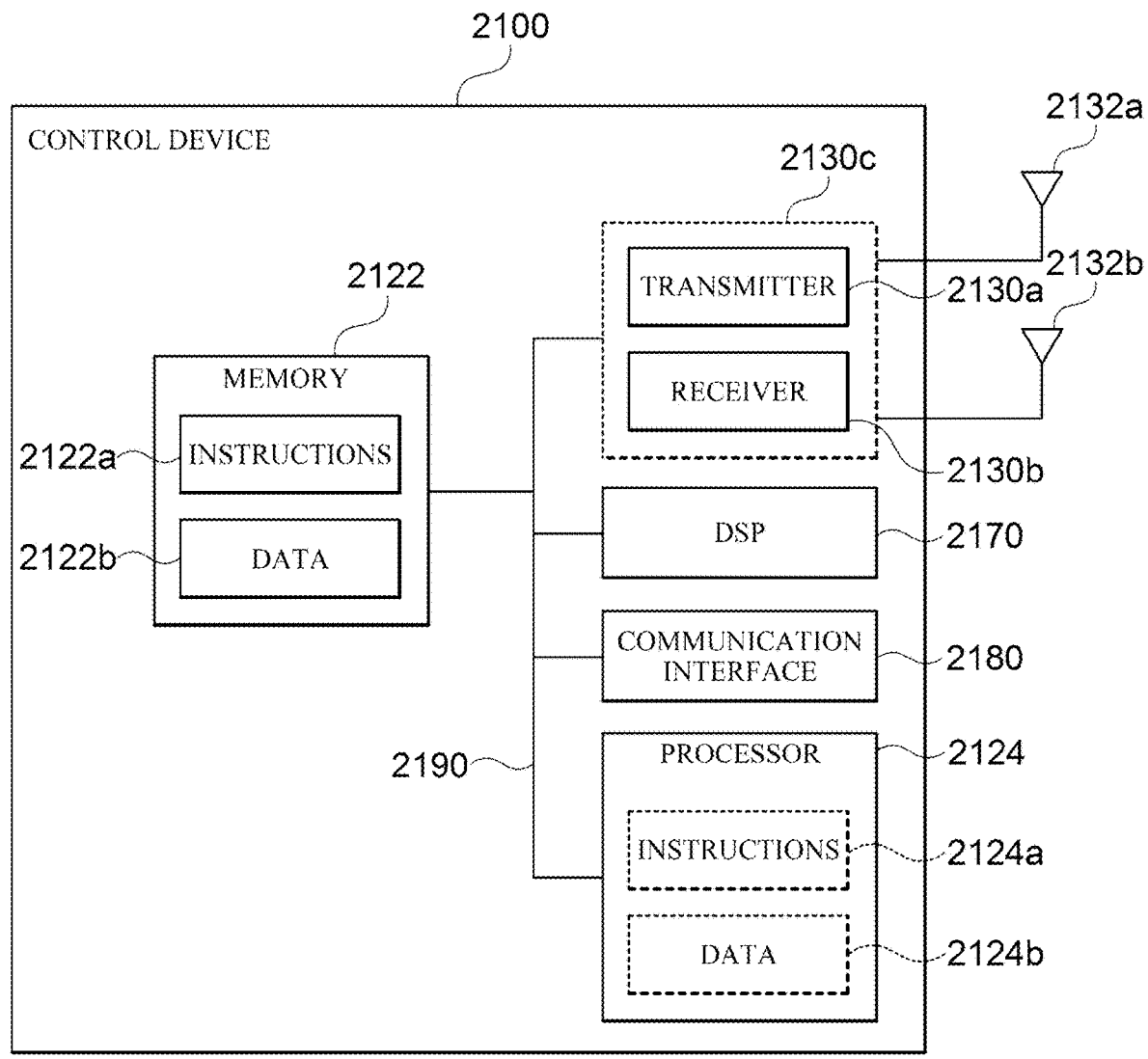
FIG. 21 is a block diagram illustrating detailed components of a control device according to an exemplary embodiment of the present invention.

Hereinafter, a detailed configuration of the control device 2100 for performing the method for measuring an inter-vehicle distance according to the present exemplary embodiment will be described in detail with reference to FIG. 21.

The control device may include the processor 2124. The processor 2124 may be a general purpose single or multi-chip microprocessor, a dedicated microprocessor, a microcontroller, a programmable gate array, or the like. The processor may be referred to as a central processing unit (CPU). In addition, in the present exemplary embodiment, the processor 2124 may also be used in combination with a plurality of processors.

The control device may also include the memory 2122. The memory 2122 may be any electronic component capable of storing electronic information. The memory 2122 may also include a combination of memories 2122 in addition to a single memory.

Data and instructions 2122*a* for performing the method for measuring an inter-vehicle distance according to the present invention may be stored in the memory 2122. When the processor 2124 executes the instructions 2122*a*, all or some of the instructions 2122*a* and the data 2122*b* required for the execution of the instructions may be loaded 2124*a* and 2124*b* onto the processor 2124.

The control device 2100 may include a transmitter 2130*a*, a receiver 2130*b*, or a transceiver 2130*c* to allow transmission and reception of signals. One or more antennas 2132*a* and 2132*b* may be electrically connected to the transmitter 2130*a*, the receiver 2130*b*, or each transceiver 2130*c* and may further include antennas.

The control device 2100 may include a digital signal processor (DSP) 2170. The DSP 2170 may allow the vehicle to process digital signals quickly.

The control device 2100 may also include a communication interface 2180. The communication interface 2180 may include one or more ports and/or communication modules for connecting other devices with the control device 2100. The communication interface 2180 may enable the user and the control device 2100 to interact.

Various components of the control device 2100 may be connected together by one or more buses 2190, and the buses 2190 may include a power bus, a control signal bus, a state signal bus, a data bus, and the like. Under the control of the processor 2124, the components may transmit information to each other through the bus 2190 and perform a desired function.

Meanwhile, in the above-mentioned exemplary embodiments, for convenience of explanation, although it has been described that the distance between the reference vehicle and the front vehicle is calculated as an example, but the present invention is not limited thereto. The method for measuring an inter-vehicle distance according to the present invention may be equally applied to a case of calculating a distance between the reference vehicle and a rear vehicle.

Meanwhile, in the specification and the claims, terms such as "first", "second", "third", "fourth", and the like, if any, will be used to distinguish similar components from each other and be used to describe a specific sequence or a generation sequence, but is not necessarily limited thereto. It will be understood that these terms are compatible with each other under an appropriate environment so that exemplary embodiments of the present invention set forth herein may be operated in a sequence different from a sequence illustrated or described herein. Likewise, in the case in which it is described herein that a method includes a series of steps, a sequence of these steps suggested herein is not necessarily a sequence in which these steps may be executed. That is, any described step may be omitted and/or any other step that is not described herein may be added to the method.

In addition, in the specification and the claims, terms such as "left", "right", "front", "rear", "top", "bottom", "over", "under", and the like, if any, do not necessarily indicate relative positions that are not changed, but are used for explanation. It will be understood that these terms are compatible with each other under an appropriate environment so that exemplary embodiments of the present invention set forth herein may be operated in a direction different from a direction illustrated or described herein. A term "connected" used herein is defined as being directly or indirectly connected in an electrical or non-electrical scheme. Here, targets described as being "adjacent to" each other may physically contact each other, be close to each other, or be in the same general range or region, in a context in which the above phrase is used. Here, a phrase "in an exemplary embodiment" means the same exemplary embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms "module" and "unit" for components used in the present specification are used only in order to easily make the specification. Therefore, these terms do not have meanings or roles that distinguish from each other in themselves.

Terms used in the present specification are for explaining exemplary embodiments rather than limiting the present invention. In the present specification, a singular form includes a plural form unless explicitly described to the contrary. Components, steps, operations, and/or elements mentioned by terms "comprise" and/or "comprising" used in the specification do not exclude the existence or addition of one or more other components, steps, operations, and/or elements.

Hereinabove, the present invention has been described with reference to the exemplary embodiments thereof. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the exemplary embodiments disclosed herein should be considered in an illustrative aspect rather than a restrictive aspect. The scope of the present invention should be defined by the claims rather than the above-mentioned description, and equivalents to the claims should be interpreted to fall within the present invention.

Meanwhile, the method for measuring an inter-vehicle distance according to various exemplary embodiments of the present invention described above may be implemented as programs and be provided to servers or devices. Therefore, the respective apparatuses may access the servers or the devices in which the programs are stored to download the programs.

In addition, the control method according to various exemplary embodiments of the present invention described above may be implemented as programs and be provided in a state in which it is stored in various non-transitory computer readable media. The non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the specific exemplary embodiments described above, but may be variously modified by those skilled in the art to which the present invention pertains without departing from the scope and spirit of the present invention as claimed in the claims. These modifications should also be understood to fall within the technical spirit and scope of the present invention.

What is claimed is:

1. A method for measuring an inter-vehicle distance using a processor, the method comprising:
    acquiring a driving image photographed by a photographing device of a first vehicle which is being driven;
    detecting a second vehicle from the driving image and calculating a ratio between an image width of the detected second vehicle and an image width of a lane in which the second vehicle is located;
    determining a size class of the second vehicle among a plurality of size classes by comparing the calculated ratio with one or more present values;
    storing a vehicle width for each of the plurality of size classes;
    determining a width of the second vehicle as a stored vehicle width corresponding to the determined size class of the second vehicle among the stored vehicle widths,
    calculating a distance from the photographing device to the second vehicle based on the determined width of the second vehicle, a focal length of the photographing device, and the image width of the second vehicle; and
    generating guide data for guiding a collision risk level corresponding to a distance difference between the first vehicle and the second vehicle, when the calculated distance is smaller than a predetermined distance,
    wherein the plurality of size classes include at least two of a first size class corresponding to a compact car, a second size class corresponding to a midsize car, and a third size class corresponding to a full-sized car.

2. The method of claim 1, wherein the calculating of the ratio includes:
   detecting the second vehicle, which is a distance measurement target, among a plurality of vehicles included in the driving image;
   identifying a left line and a right line of a lane in which the second vehicle is being driven, from the driving image; and
   determining an image width between the identified left line and the identified right line as the image width of the lane in which the second vehicle is located.

3. The method of claim 1, wherein the calculating of the ratio includes:
   identifying a left boundary and a right boundary of the second vehicle from an image of the detected second vehicle; and
   determining an image width between the identified left boundary and the identified right boundary as the image width of the second vehicle.

4. The method of claim 1, wherein the determining of the size class of the second vehicle includes:
   determining the size class of the second vehicle as the first size class when the calculated ratio is smaller than a first value;
   determining the size class of the second vehicle as the second size class when the calculated ratio is greater than the first value and smaller than a second value; and
   determining the size class of the second vehicle as the third size class when the calculated ratio is greater than the second value.

5. The method of claim 1, wherein in the detecting of the second vehicle when the first vehicle is being driven on the lane,
   the second vehicle located on the same lane as the first vehicle is detected among a plurality of vehicles included in the driving image.

6. The method of claim 1, wherein in the detecting of the second vehicle when the first vehicle is departing from the lane,
   the second vehicle located on a lane to which a front surface of the first vehicle is directed is detected among a plurality of vehicles included in the driving image.

7. The method of claim 1, wherein in the calculating of the distance, the distance from the photographing device to the second vehicle is calculated based on $$!D = W \times (f \div w), \text{ and}$$

D is the distance from the photographing device to the second vehicle, W is the width of the second vehicle, f is the focal length of the photographing device, and w is the image width of the second vehicle.

8. An apparatus for measuring an inter-vehicle distance, the apparatus comprising:
   an image acquiring unit configured to acquire a driving image photographed by a photographing device of a first vehicle which is being driven;
   a detecting unit configured to detect a second vehicle from the driving image;
   a ratio calculating unit configured to calculate a ratio between an image width of the detected second vehicle and an image width of a lane in which the second vehicle is located;
   a vehicle size class calculating unit configured to determine a size class of the second vehicle among a plurality of size classes by comparing the calculated ratio with one or more present values;
   a vehicle width calculating unit configured to store a width of the vehicle for each of the plurality of size classes, and determine a width of the vehicle as a stored vehicle width corresponding to the determined size class of the second vehicle among the stored widths of the vehicle;
   a distance calculating unit configured to calculate a distance from the photographing device to the second vehicle based on the determined width of the second vehicle, a focal length of the photographing device, and the image width of the second vehicle; and
   a guide data generating unit configured to generate data for guiding a collision risk level corresponding to a distance difference between the first vehicle and the second vehicle, when the calculated distance is smaller than a predetermined distance,
   wherein the plurality of size classes include at least two of a first size class corresponding to a compact car, a second size class corresponding to a midsize car, and a third size class corresponding to a full-sized car.

9. The apparatus for measuring an inter-vehicle distance of claim 8, wherein the detecting unit detects the second vehicle, which is a distance measurement target, among a plurality of vehicles included in the driving image, and
   the ratio calculating unit identifies a left line and a right line of a lane in which the second vehicle is being driven, from the driving image, and determines an image width between the identified left line and the identified right line as the image width of the lane in which the second vehicle is located.

10. The apparatus for measuring an inter-vehicle distance of claim 8, wherein the ratio calculating unit identifies a left boundary and a right boundary of the second vehicle from an image of the detected second vehicle, and determines an image width between the identified left boundary and the identified right boundary as the image width of the second vehicle.

11. The apparatus for measuring an inter-vehicle distance of claim 8, wherein the vehicle size class calculating unit determines the size class of the second vehicle as the first size class when the calculated ratio is smaller than a first value, determines the size class of the second vehicle as the second size class when the calculated ratio is greater than the first value and smaller than a second value, and determines the size class of the second vehicle as the third size class when the calculated ratio is greater than the second value.

12. The apparatus for measuring an inter-vehicle distance of claim 8, wherein the distance calculating unit calculates the distance from the photographing device to the second vehicle based on $$!D = W \times (f \div w), \text{ and}$$

D is the distance from the photographing device to the second vehicle, W is the width of the second vehicle, f is the focal length of the photographing device, and w is the image width of the second vehicle.

13. An electronic device that provides guidance for assisting a driver based on an inter-vehicle distance, the electronic device comprising:
   an output unit configured to output guide information which is checked by the driver;
   an image acquiring unit configured to acquire a driving image photographed by a photographing device;
   a ratio calculating unit configured to detect a front vehicle from the driving image and calculate a ratio between an image width of the detected front vehicle and an image width of a lane in which the front vehicle is located;

a vehicle size class calculating unit configured to determine a size class of the front vehicle among a plurality of size classes by comparing the calculated ratio with one or more present values;

a vehicle width calculating unit configured to store a width of the vehicle for each of the plurality of size classes, and determine the width of the vehicle as a stored vehicle width corresponding to the determined size class of the front vehicle among the stored widths of the vehicle;

a distance calculating unit configured to calculate a distance from the photographing device to the front vehicle based on the determined vehicle width of the front vehicle, a focal length of the photographing device, and the image width of the front vehicle;

a guide data generating unit configured to generate data for guiding a collision risk level corresponding to a distance difference between the photographing device and the front vehicle, when the calculated distance is smaller than a predetermined distance;

a control unit configured to control the output unit to output a front vehicle collision warning according to the calculated distance, wherein the plurality of size classes include at least two of a first size class corresponding to a compact car, a second size class corresponding to a midsize car, and a third size class corresponding to a full-sized car.

14. The electronic device of claim 13, wherein the output unit further includes a display unit configured to combine the photographed driving image with a guidance object to output an augmented reality image, and the control unit generates a guidance object for the front vehicle collision warning and controls the display unit to display the generated guidance object for the front vehicle collision warning superimposed on a front vehicle display region of the augmented reality image.

\* \* \* \* \*